United States Patent
Zhang

(10) Patent No.: US 10,383,353 B2
(45) Date of Patent: Aug. 20, 2019

(54) VEGETABLES WASHING METHOD CAPABLE OF SPLITTING AND SEPARATING IMPURITIES, AND MACHINE FOR IMPLEMENTING THE SAME

(71) Applicant: Weiwen Zhang, Shantou (CN)

(72) Inventor: Weiwen Zhang, Shantou (CN)

( * ) Notice: Subject to any disclaimer, the term of this patent is extended or adjusted under 35 U.S.C. 154(b) by 0 days.

(21) Appl. No.: 14/786,987

(22) PCT Filed: Apr. 21, 2014

(86) PCT No.: PCT/CN2014/000430
§ 371 (c)(1),
(2) Date: Oct. 25, 2015

(87) PCT Pub. No.: WO2014/173179
PCT Pub. Date: Oct. 30, 2014

(65) Prior Publication Data
US 2016/0058063 A1    Mar. 3, 2016

(30) Foreign Application Priority Data

Apr. 25, 2013 (CN) .......................... 2013 1 0147707
Apr. 25, 2013 (CN) ..................... 2013 2 0216259 U

(51) Int. Cl.
*A23L 19/00* (2016.01)
*A23N 12/02* (2006.01)
(Continued)

(52) U.S. Cl.
CPC .............. *A23N 12/02* (2013.01); *A23L 19/03* (2016.08); *A47J 43/24* (2013.01); *B08B 3/14* (2013.01)

(58) Field of Classification Search
CPC .... A23N 12/02; A23N 12/023; A23N 12/086; B08B 3/045; A47J 43/24; A23L 19/00
See application file for complete search history.

(56) References Cited

U.S. PATENT DOCUMENTS 2,962,886 A * 12/1960 Johnson .................. D06F 21/02
68/18 F
5,562,114 A * 10/1996 St. Martin ............. A23N 12/02
134/111
(Continued)

FOREIGN PATENT DOCUMENTS

CN            2829383 Y   * 10/2006
CN          202232889 U   *  5/2012

OTHER PUBLICATIONS

Machine translation: CN2829383; Zhang, Q.; 2006.*
Machine translation: CN202232889; Yao et al.; 2012.*

*Primary Examiner* — Mikhail Kornakov
*Assistant Examiner* — Natasha N Campbell
(74) *Attorney, Agent, or Firm* — Novoclaims Patent Services LLC; Mei Lin Wong

(57) ABSTRACT

A vegetable washing method capable of separating and splitting impurities and a machine therefor. The method comprises putting fruit and vegetable into a washing basket, then driving the wash basket to rotate by an electric motor so as to force water flow to circulate repeatedly, as a result separating the impurities and the vegetable. The method has the following three technical features of A, B and C, or at least has one of them. A. using a method for preventing the impurities thrown outside the washing basket together with the water from circularly falling into the basket again together with the water to gradually purify the vegetable in the basket; B. using a vortex center draining method to discharge the sewage and impurities; C. using a method for making the vegetable in the washing basket periodically centripetal and centrifugal motion to flip and turn the placement angle of the vegetable in the basket. The vegetable washing method enables the impurities of different specific gravities to split into different spaces, and then to be removed.

8 Claims, 15 Drawing Sheets

(51) Int. Cl.
 *A47J 43/24* (2006.01)
 *B08B 3/04* (2006.01)
 *B08B 3/14* (2006.01)

(56) References Cited

U.S. PATENT DOCUMENTS 5,904,090 A * 5/1999 Lillelund .................. F26B 5/08
 210/360.1
6,578,590 B2 * 6/2003 Leblond ............... A46B 13/001
 134/138

* cited by examiner

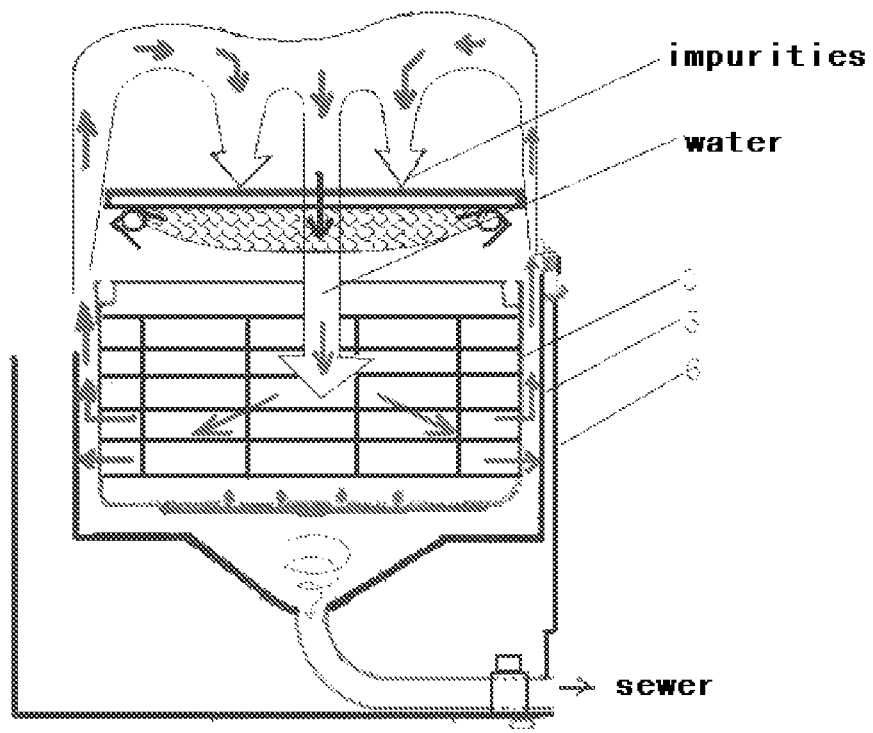
Fig20- Prior Art
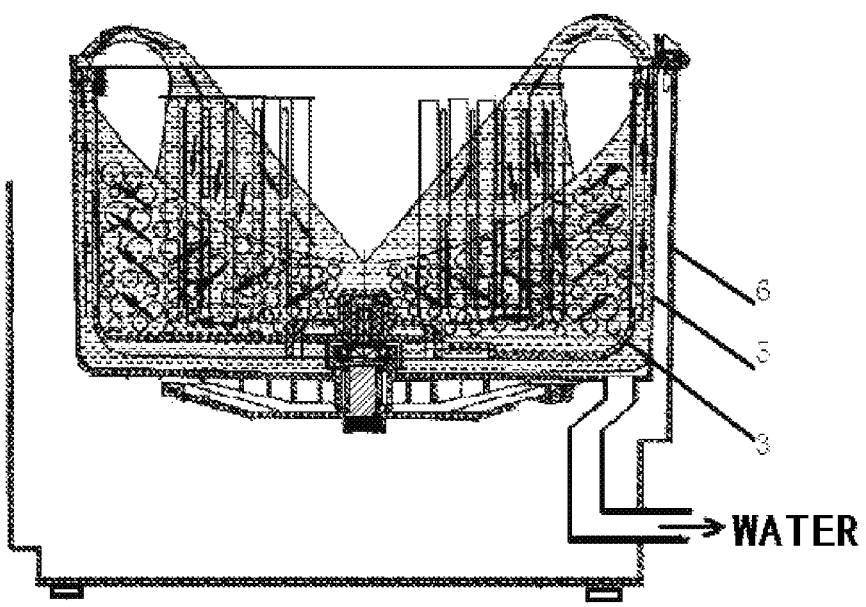
Fig21- Prior Art

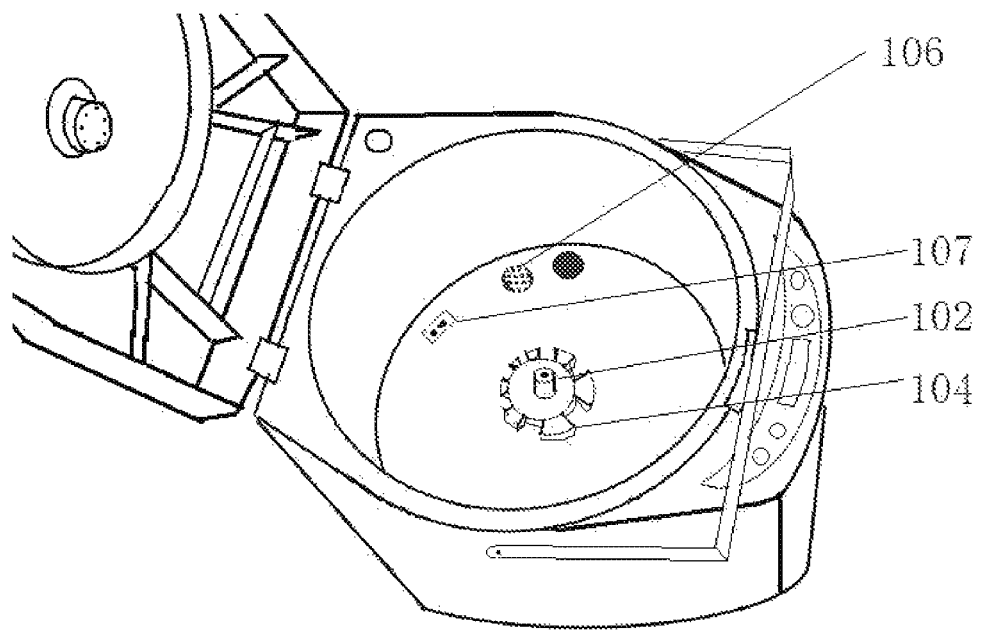
prior art
Fig22- Prior Art
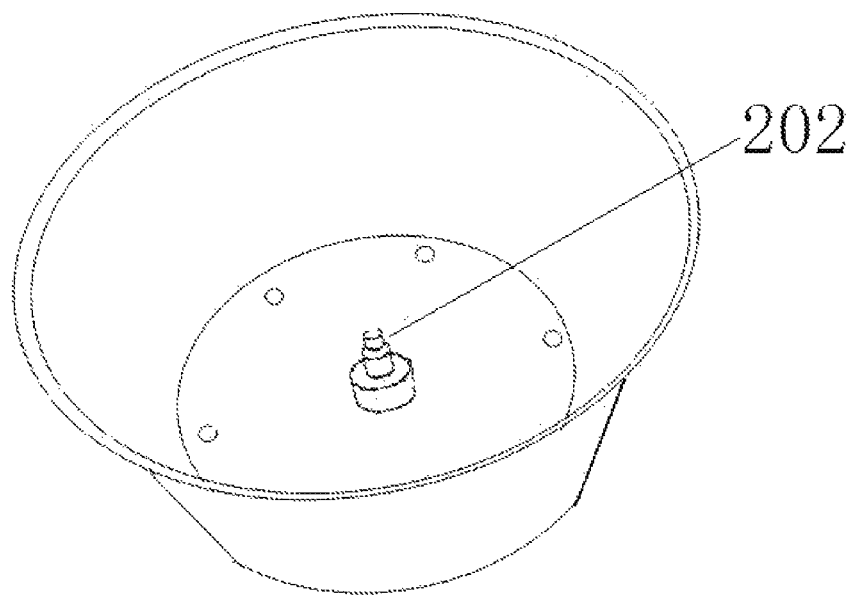
Prior art
Fig23- Prior Art

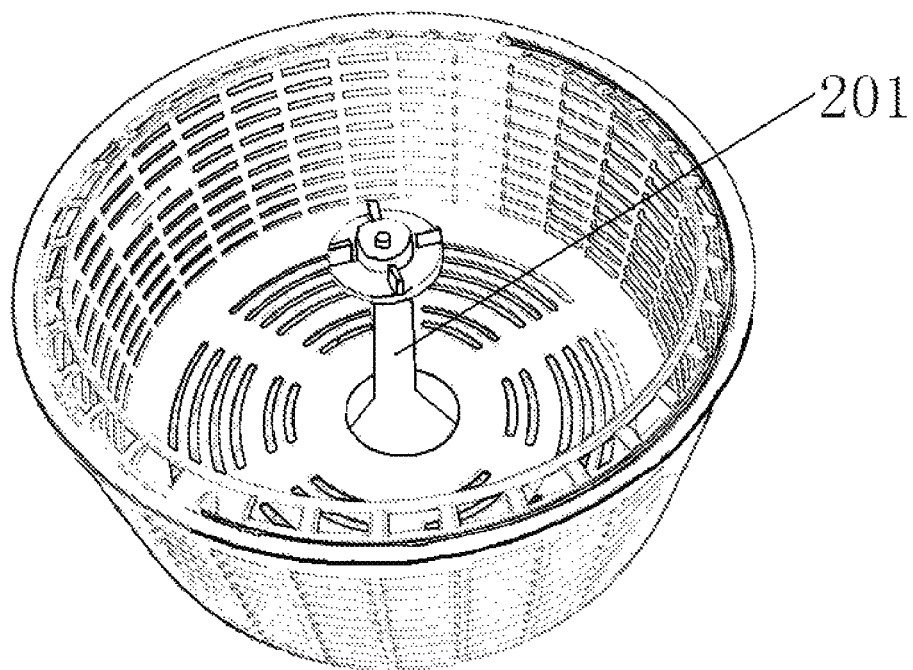
Prior Art
Fig24- Prior Art
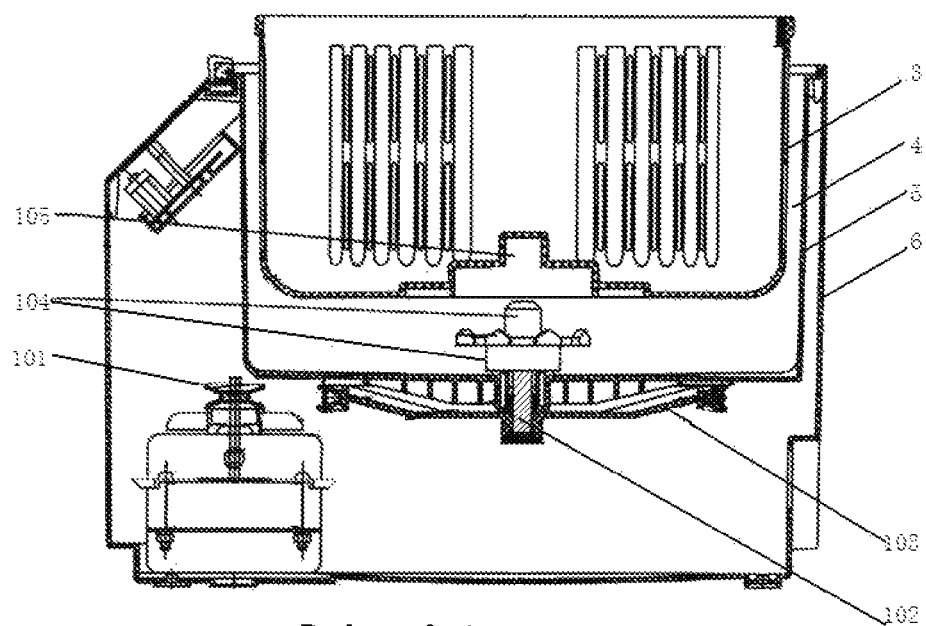
Prior Art
Fig25- Prior Art

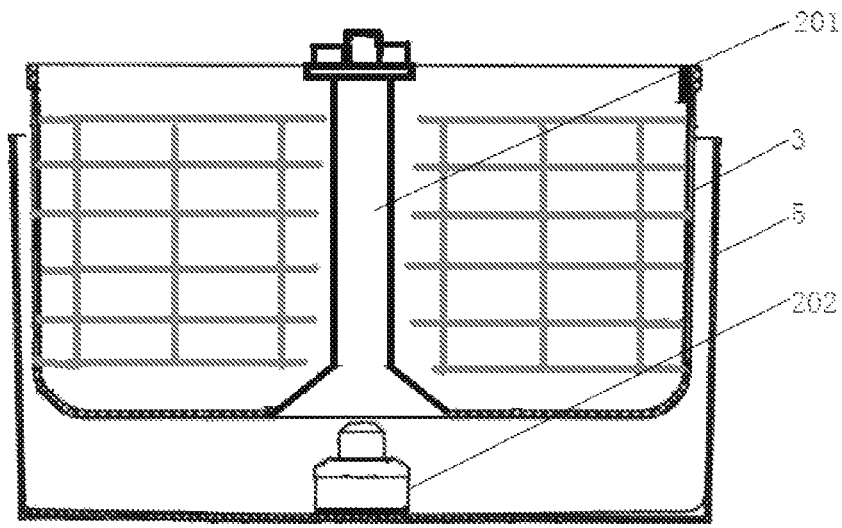
Prior Art
Fig26- Prior Art
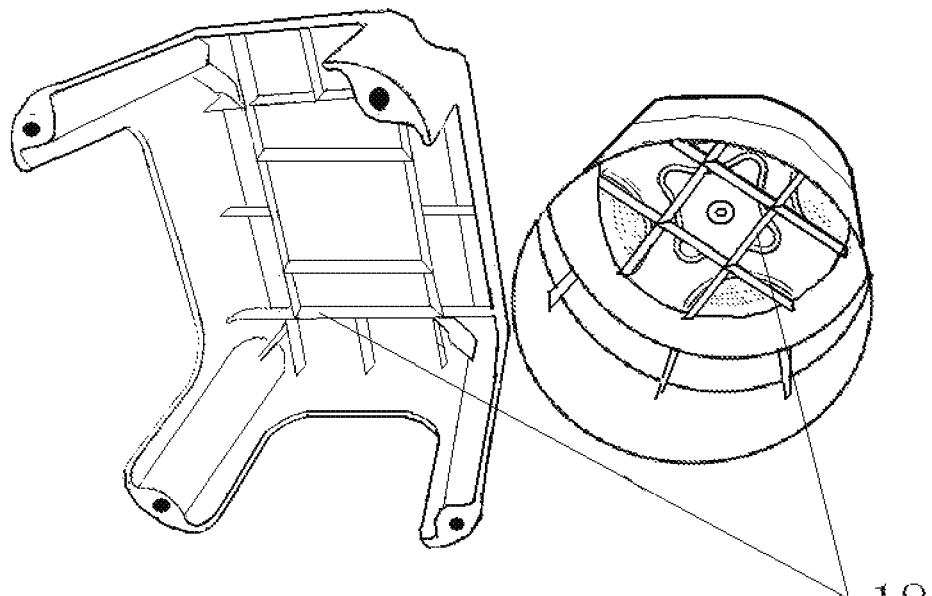
Prior Art
Fig27- Prior Art

VEGETABLES WASHING METHOD CAPABLE OF SPLITTING AND SEPARATING IMPURITIES, AND MACHINE FOR IMPLEMENTING THE SAME

TECHNICAL FIELD OF THE INVENTION

This invention relates to a kind of washing method for fruits and vegetables and a vegetable washer which applies the washing method. In particular, the method and machine can separate different impurities from the fruits and vegetables to different space in the washing process.

BACKGROUND ART OF THE INVENTION

First, let us learn about the kind of impurities in the unwashed vegetables: The first category, namely Group A impurities, are invisible impurities such as pesticides, viruses, bacteria and etc. that remain on the surface of fruits and vegetables; The second category, namely Group B impurities, are visible substances attached or included and of a relative larger proportion, such as sand, grit or mud and etc.; The third category, namely Group C impurities, are visible substances attached or included but of a relatively smaller proportion, such as stale leaves, weeds, hair, insect etc., which are included in vegetables.

The problem that this patent will solve is how to remove the Group B and Group C impurities.

Second, let us analyze how the process of traditional manual washing of vegetables remove the three categories of impurities. Prepare two bowls. First, put water in the first bowl until the bowl is full, and put fruits and vegetables into the water and allow soaking for an appropriate time so that the Group A impurities would be dissolved in the water, then put a hand into the water, grab a handful of vegetables and constantly make the motion of turning, up and down shaking and left and right shaking in the water so as to make the Group B impurities fall into the water from the gap of the vegetables, and to make the Group C impurities detach from the gap of the vegetables (but the vegetables and impurities still coexist in the same bucket), therefore the separation of vegetables from Group B impurities and Group C impurities are realized, (This article will define the breaking the clamping force of the attachment of impurities and the loosening of impurities at the surface of vegetables, as spin-off, which is also known as X operation), then grab one handful and repeat the above steps until all the vegetables in the bowl were being operated for one time, and at this stage, half of the whole process of washing vegetables is completed. At this moment, the vegetables and the three kinds of impurities still coexist in the same bowl. Then, put the hand into the water several times, each time take up a handful of vegetables, dipping in the water surface continuously and moving above the water to dry, and then put them into the second bowl, repeat until the vegetables in the first bowl are completely transferred to the second bowl while the three kinds of impurities and water are still in the first bowl, thus the step of separately placing the vegetables and the Group B and Group C impurities are realized (which is referred to as splitting, also known as Y operation). At this point, the second half of the whole process of washing vegetables is completed.

$$X \text{ operation} + Y \text{ operation} = \text{the complete process of washing vegetables.}$$

Obviously, we can pour away the water and impurities in the first bowl and then fill a full bowl of water and repeat (X operation+Y operation), to conduct the second time of washing of the vegetables. In fact, washing vegetables in our daily life is also the process of repeating X+Y operation by changing the water many times.

Now, can we wash the vegetables if we just do X operation without Y operation? In the above example, after the completion of X operation in the first bowl, if the vegetables are not move to the second bowl to complete Y operation which splits the vegetables and impurities, but a pump is used to draw the water in the first bowl of water, then at this time, vegetables and Group A, B, C impurities coexist in the same bowl and are mixed together, then if someone ask you not to touch the dirty vegetables with your hands but pour them into the pan directly, will you dare to eat? That is equal to cooking vegetables with weed, hair, sand, worm and various impurities.

This shows that, without Y operation, Group B and C impurities would not be removed completely. Without Y operation, vegetables cannot be washed clean no matter how many times of X operation are repeated, strictly speaking, only half are washed, the vegetables are not washed completely.

The development history of the vegetable washer is reviewed as follows.

The earliest vegetable washer has no mechanical moving parts, now known as static vegetable washer. The purpose is to degrade pesticide residues in fruits and vegetables. The method is that putting through the water and ozone in a closed container and place the fruits and vegetables in the ozone-dissolved water for an appropriate time, using the strong oxidation of ozone O3 to cause the decomposition of pesticide residues in fruits and vegetables on the surface to dissolve in water, and then poured out with the water. As the purpose is to wash off pesticide residues impurities on the surface of vegetables, namely Group A impurities, and such vegetable washer still sells widely and is still popular.

Later, a Chinese patent whose Patent No. is 912 008 21.0 discloses vegetable washer with a kind of mechanical movement, now called dynamic vegetable washer. Its program is that: Set the washing-basket in the washing-bucket with closures (in the original text of this patent, the washing-basket is named as 'permeable inner bucket', while the washing-bucket is called outer bucket. To unify the title does not cause confusion, collectively referred to herein washing-baskets and washing-bucket), bottom of the bucket is planar or quasi-planar bottom of the bucket has come through from the bottom surface of the shaft, the peripheral end of the bucket with a water inlet and the outlet, the chassis features a rotatable washing-basket drive electrical and electronic control equipment, the upper surface of the washing-bucket is a waterproof panel. When use, the fruit and vegetables are placed into the washing-basket, washing-basket is rotated by a motor driven, thereby forcing the water was flung by the centrifugal force within the washing-basket basket and bucket gap then rose again to basket. Difficult sucked down into the basket again by centrifugal force flung gap baskets and buckets, so the cycle of flow, flow per share of each cycle are through the slit of the basket of vegetables to form a rapid relative motion with the surface of fruits and vegetables, produce friction to impurities and vegetable spin off to complete the X operation. It should be noted here that: the washing effect is due to water through friction, rather than the impact of falling water, the existing vegetable washers as advertised in the television emphasize that the vegetable washers provide a large amount of water falling action for flushing and washing vegetables, and these actions are called spray. This is a technical bias, prejudice of this technology is discussed below.

This patent scheme ingenious solve issues of vegetables X operation (except the flipping question of vegetables), although there is no solution to problem Y operation, but the inventor of the program there is no basis in human vegetable washer concept, first put such a viable option, very impressive as a pioneer. More commendable is that, compared to the complex robot designed to imitate Mount manpower program, this program's structure is simple and low cost. The program has been widely used since many manufacturers (see FIG. 21 and FIG. 22). While many manufacturers have the shape and position of the individual components of the program are modified to show the difference.

For example, as to the question of setting up a retaining part in a position above the washing-basket in the bucket, there is a variety of same transformation, for example, it can be located in the upper portion of the washing-bucket, and it can also be provided on the lower surface of the lid, or a separate inner cover circle, not even flap, then the water will naturally fall line after hitting the lid (this phenomenon is called the spray drops). Because the basket center of the cavity is an instant low-pressure area, the water above will be sucked back into the basket, which some people call the retaining part backwater retaining member board. These water retaining parts are called backwater board, manger, water retaining reinforcement, block hydrosphere, even the water retaining cover, which are almost all through the same means to achieve the same basic functions and the same effect. Although the changes caused by the location and the shape of the water retaining parts can make the water into the basket in different position, the difference of falling points doesn't make any change in the effect of washing vegetables.

Another example, as to the problem of setting water institutions under the washing basket, wash dishes are installed under the washing-basket in the original patent, and emphasis on that washing dishes and washing baskets are synchronous and not move relatively. Under the revelation of such a technical, then, when the washing-basket is made by plastic, technical personnel in the field of casting is easy to think that the washing-basket and washing dish can be cast as a whole, simplifying the wash dish to water basket at the end of the function of the bulge. In the same way, the shape of the bump can have myriad similar variants, such as it can be made into cross, also can be made into X, also can be made into rice word, or be made into swastika fonts, and so on, which can be called water board, dial article water, or the water bar, which in short plays a role of raising water.

The above-mentioned Chinese patent No. 912 008 21.0 has been 20 years before the present.

Incidentally, now commercially available dynamic vegetable washers are mostly installed with ultrasonic generator ozone or ultraviolet generating device or a plasma generating device, added with the static vegetable washer functions, in order to remove the Group A impurities.

There is another structure of vegetable washer of existing technology that the driving force above the basket, that the motor is mounted on the lid of the washing-bucket. The structure of the washing-basket is a long shaft with a rod in the bottom center, and the axis coordinates with output axis of the motor under the lid of the bucket. The bottom surface of the bucket has shaft seat raised, the shaft seat coordinates with the recessed hole in the bottom surface of the washing basket, and as support for the washing-basket (see FIG. 23 and FIG. 26).

See FIG. 22, 23, 24, 25, 26, features of the two vegetable washers of the existing technology are:

1, No function of the division of Group B and Group C impurities and no division space.

2: Set shaft through 102 in the bottom center of the washing-bucket (see FIG. 22 FIG. 25) or convex shaft seat 202, see FIG. 23 FIG. 26.

3: The outfall is set only around the bottom in the washing-bucket.

4: On the drainage method, there is no way to use the spinning suction from the center of the vortex to discharge pollution.

5: The bucket shaft through the shaft seat 102 in the center of the bottom of the washing-basket or the raised shaft 202 as support for the washing-basket (positing a collar 104 on shaft 102 in order to increase the bearing surface.)

6: The bottom of washing-bucket is flat or quasi plane.

7: The structure of the center in the basket's bottom is protruding fit convex platform (FIG. 22 FIG. 25) or protruding rod long axis (FIG. 24 FIG. 26)

8: The opening of the washing-basket is widely open.

Because of the vegetable washer of the existing technology with these structural features, after using it to wash vegetables, there are the following three questions:

The first problem, Group C impurities are still mixed with vegetables, because: Group C impurities were thrown from the basket with the water cycle, rising to the top of the basket as the gap with the water bucket, but falling back to the vegetables in the basket with the water falling (if we call the water drops as spray, then spraying water down, while the impurities are spraying to the basket), so no matter how many times been washed, finally Group C impurities are still mixed in the vegetables; you cannot split the problem of removal of Group C impurities.

The second problem, part of Group B impurities is still mixed with vegetables, some accumulated in the bottom of the bucket around the center of the bucket shaft 102 and were not discharged. Because: during draining, the water flow no longer did upward motion along the gap between buckets and baskets with the reduction of water, and Group B impurities were so heavy that it sank to the bottom of the bucket, and gradually rotated to the bottom center of the bucket by the water rolling, to gather around the center axis of the bucket. Precisely the center bottom of the bucket of the vegetable washer of the existing technology is a rotary axis, and the drain can only be set in around the bottom of the bucket, so these Group B impurities cannot be drained. Many consumers are not aware of this problem because the sleeve mounted to the shaft under the basket blocks the line of sight. Part of the Group B impurities remain in the bottom of the bucket portion, partly mixed in vegetables removed by the user. Small parts are discharged from the drain opening by the bucket with the water falling. That is to say, the Group B impurities and vegetables are still mixed in a bucket after being washed one time. When put water into the bucket and start the machine again, the Group B impurities in the end of the bucket participate in the movement of water cycling up and down. (Such as consumers reflected washing amaranth using the vegetable washer of existing technology, and then fry amaranth to eat, the upper and lower teeth always grind to sand).

The third problem, there exists dead angle of cleaning, which is not conducive for the vegetables thoroughly cleaned. Because in the process of washing vegetables, no matter how many times we change the water or how many times be washed in water, the vegetables in the cleaning process has been relatively concentrated near the side wall in the washing basket, without a circumferential movement (be relative to the circular movement of the basket), also without a centripetal movement, also without eccentric exercise again (except when the machine started running first thrown into the washing-basket's vicinity). That is to say, in the process of these vegetables receiving water's erosion, a fixed positive side is maintained (because the water is a fixed path in the loop), it will easily lead to dead angle of cleaning and is not conducive to thoroughly clean vegetables, which makes the degree of washing to clean compromised.

In other words, the existing commercially available vegetable washer has just finished of washing vegetables, but not finished the Y operation, and also cannot solve the problem of flipping fruits and vegetables in X operation, so strictly speaking, even X operation is not fully completed. Overall probably only completed 40% of the whole process. After washing vegetables with this vegetable washer, pesticide residues may be dissolved into the water with the water drained away due to the action of ozone, and solve the degradation and removing of the Group A impurities, but Group B impurities such as weeds, insects, rotten leaves, stale leaves, hair and etc. are still mixed with vegetables in among the basket, not being separated from vegetables; Group B impurities, such as sand, grit and mud, gather in the central portion of the washing-bucket and is partly mixed in vegetables, and would not discharge with the water. When the second time putting water to wash vegetables, came along with the irrigation of the vegetable washer and rotation of the washing-basket, the sediment is connection with vegetables in the bucket, cannot be split, still need wash several times artificially to complete the Y operation. That is to say, it does not really achieve the liberation of the human and cannot entirely complete the whole process of washing vegetables by machines (X+Y operation). Strictly speaking, it cannot be called vegetables washed up, but only say that of half, or even less than half (due to the vegetables are not fully flipped, existing blind angle, which makes the degree of washing to clean compromised.)

These three problems are the reason that the vegetable washer can't be widespread for a long time. Consumers who were not aware of these problems may buy this machine. The consumers who bought this kind of machine and found the three problems after using the machine would not recommend their relatives and friends to buy the machine. (unless his aim is to degrade the pesticide residue on the surface of the vegetables, willing to done Y operation manually. This does not make great difference to buy a static vegetable washer. Though Group A impurities are removed, the problem of removing Group B and Group C impurities didn't be solved thoroughly).

If you want to manually complete Y operation without solving the three problems, the dynamic vegetable washer exists meaningless. For example, in the cold winter, people have to manually wash vegetables once or twice after washing them by the vegetable washer, but still cannot avoid the hand being soaked into the icy water; another example is that a fashionable lady, who paints her nails red, still cannot achieve washing vegetables without removing her makeup; another example, on some important occasion where people must eat raw vegetables in Western, people still cannot avoid risks of infectious disease from hand washing vegetables and hand touching vegetables.

If these three problems are solved, it must be a leap of "quality" for dynamic vegetable washer, because if these three problems are solved (together with ozone to remove Group A impurities), all the impurities in vegetables could be removed.

How to solve the three problems, which has been troubled the industry of vegetable washer for not being solved in the past 20 years. Both researchers and manufacturers are trying to solve these three questions of the existing vegetable washer, in order to complete the whole process, the X+Y two operations, of washing vegetables completely by the vegetable washer, to tell consumers loudly that: "my vegetable washer can not only spin off impurities but also separate and divide impurities, users can actually pour the vegetables into the pan to fry directly after washing them by the machine".

Researchers have been theoretically designed a variety of complex methods in 20 years, trying to solve the three problems. For example: in order to solve the problem of flipping vegetables, in some programs the vegetable washer is designed similar to tumbling-box vegetable washer, to boost the flipping of vegetables, see the technology program of drum vegetable washer in Chinese Patent No. 012 372 01.3. Another example: in order to complete Y operation, which let vegetables and the three impurities in vegetables retained in a different space, some people simulate mechanical hands to imitate human hands on existing vegetable washer and use mechanical fingers to gripper vegetables from water and placed them in another bowl. Although the effect of these valuable exploration is not ideal, the explorer as a forerunner is undoubtedly worthy of our later people's admiration.

The reason why these three problems are difficult to solve is that the existing commercial vegetable washer obviously does not come out of the shadow of the laundry machine (for example: both the opening of washing-basket and washing-bucket are without shelter; both the center of the bottom of washing-basket and washing-bucket exist axis across upward; and some other characteristics, such as the drainage openings are around the bottom of the bucket), of course we cannot solve these three problems. Washing vegetables is unlike laundry: first, no matter how dirty the clothes are, there are no much sediment, weed, stale leaves, and so on, but only the Group A impurities, such as perspiration, stains, dirt and etc., adhered to the surface of the garment, so there is no need to fish out and divide Group B and Group C impurities, and the washing work is relatively much easier. Secondly, the water left after washing clothes can be directly discharged without clogging drains and drain valve, but washing vegetables is different, because a lot of water-insoluble Group B and Group C impurities are in the vegetables, which would directly block up the nozzle of the drain-pipe soon if discharged with the water into the drain-pipe. Calmly say, even if the nozzle is not blocked, when Group C impurities go into the outfall, it is very easy to make the rubber plug stuck in the rubber stopper at the drain valve, leading to leakage for the reason of the rubber stopper closed out of the position.

After years of research, this patent solves all the three problems, and overcome the bias of this technology relying on spray vegetables and makes a qualitative change of the washing cleanliness of vegetables, and achieves unexpected significant effect, which is completely removing all impurities in vegetables. Moreover, implementing this patent to manufacture the machine costs much lower, compared with many solutions during the 20 years.

SUMMARY OF THE INVENTION

To solve the above three problems of the existing vegetable washer, complete the entire process of washing vegetables by a machine, which includes the X operations and Y operations, the present invention discloses the method of washing vegetables, which can split, separate and divide the impurities, and the machine which implement the method. This machine is also known as vegetable washer of drain contamination of the center attached by the impurities retractor, and the devices of this machine in solving the three problems of the existing vegetable washer are used for simple structure, low cost, ingenious method, and the effect is significant. It has a qualitative leap. Say this is not advertising in the abstract but justified for the following reasons: The reason why the effect is obvious is that there are four substances including the three impurities and vegetables mixed in the basket at the beginning, but these four substances are automatically split in four different spaces after washing, just like identified by the human eyes, like picked out by manpower picking. It can real achieve pouring vegetables in the basket directly into the pan to fry instead of pouring the vegetables together with impurities into the pan to fry. The reason of the ingenious method is that there is actually no need to add a lot of complicated machinery or a lot of cost to achieve such remarkable progress.

The washing method of washing vegetables, which can split, separate and divide the impurities in the invention, comprises the following steps: put fruits and vegetables into the a water-permeable washing-basket in the washing-bucket with a sealing cover, wherein the washing-basket is driven by the motor to rotate such that the water is forced to be flung from inside of the washing-basket to the gap of the basket and bucket by the centrifugal force, then rise to the top of the basket, and blocked and sucked down back into the basket; then, be flung to the gap of the basket and bucket by the centrifugal force again, like this cycling flow, each cycle of every stream of water goes through the gap of the vegetables in the basket, to form rapidly relative motion with the surface of the fruit and vegetable, and form friction, to destroy impurities attached to the surface of vegetables that is to be washed, and loose the clamping degree of vegetables to impurities. The present invention is characterized in that, this method has the following three technical features of A, B and C at the same time, or at least one of the following three technical characteristics A and B and C.

Feature A uses the method of "preventing the impurities flung out of the basket with water to cycle and fall down back into the basket with water" to clean the vegetables in the basket gradually. The subordinate concept of this method includes the method of "adding dense sieve in the way of water's falling to retain impurities that was brought to the mouth above the water and let the water continue to fall through the sieve"; Feature B uses a "vortex center draining" method to discharge the sewage and impurities; The subordinate concept of this method includes the method of by: (1) opening a drainage outlet the center of the bottom of the washing-bucket and rotating to wash the basket and draining off water at the same time to implement draining contamination. So the opening of drain-pipe in the center of the drain in the bottom of the bucket is also the vortex center, where the water makes strong rotation to get the exclusion of impurities, especially the heavier Group B impurities such as sediment which accumulates to the center of the bucket due to the rotational movement of water while the water level drops; The stated the opening of the draining off water and sewage in the center bottom of the washing-basket is a center opening of the draining off water and sewage which can be closed and opened, and the stated washing-basket is a basket that without shaft to be connected to the center of the bottom of the bucket; in the washing-bucket there is a special carrying device to carry washing-basket and special positioning device to limit the washing-basket's position and a special transmission mechanism will pass torque to the washing-basket, the "special" means "in addition to the shaft connected with the center bottom of the bucket of the washing-bucket or axle seat outside".

Feature C is the method of flipping and turning the placement angle of the fruits and vegetables in the washing-basket, is making the vegetable in the washing basket periodically centripetal and centrifugal motion; Because of the above stated opening of central in the bucket drain contamination, uses the water flow centripetal motion in the process of water draining to drive fruits or vegetables to flip and scroll to basket center, and next time when the washing-basket completes taking water and the washing-basket begins to rotate or scroll, using centrifugal force to force fruits and vegetables to flip and scroll to the edge of the basket, to achieve full rolling and flipping once more, so as to imitate effects of human flipping fruits and vegetables in the water. Like this every time water is changed, each vegetable is placed to another angle and changed to another face as the face of the water. And this flip is done every time after we change water and is unlike the violence when washing clothes in the washing, so it will not cause harm to fruits and vegetables. In a more than 20 minutes process of washing vegetables, you may need to change the water 4-5 times, there will be 4-5 times the dish turned a switch, for a different display angle, and there are 4-5 different positive sides, and the problem of the dead exists in washing vegetables in the existing technology is solved. The state three features of methods, feature A, feature B and feature C can exist in one vegetable washer at the same time, or there are only one or two of the three exist in one vegetable washer.

Of course, only when three features are equipped the vegetables can be cleaned thoroughly to the highest degree. Moreover, feature A is the prerequisite technical of feature B. If there is no feature A but feature B, then because the problem that the Group C impurities are not split and collected is not resolved, the Group C impurities will be taken into sewage pipes clogged sewage by the vortex, that is to say, the setting of filter in the basket port is the prerequisite technical of central sewage. If there is no feature B but feature A, then because the problem that the Group B impurities are not split and collected is not resolved, the invention's purpose, clean and remove impurities completely, cannot be completed, too. That is to say, in other words, A and B mutually cooperate to work.

As we all know, in the vegetable washer, the cross-section of bucket chamber of the washing-bucket and the cross-section of the washing-basket is a pair of concentric circles, so shaft of the washing-basket naturally goes through the center of the concentric circles. So, in the center of the bottom of the bucket of the vegetable washer in the existing technology sets up rotation axis penetrated upward (see FIGS. 22 and 25) or in the center bottom of the bucket located pedestal (see FIGS. 23 and 26) is also a matter of course, and nothing wrong; this set is a necessarily association of technician in this technical field. And the innovative thinking and creative work of the present invention lies in abandoning the often irrational and conventional program. Open an outlet in the center bottom of bucket filled with water, and the sewage effect has been improved essentially. If coupled with the bottom of the bucket as funnel-shaped, Drain thoroughly.

As we all know, all the vegetable washers in the existing technology stress washing vegetables by spraying, called "spray technology", which emphasizes water returns from above and fells off in the washing-basket, and felling off in the washing-basket mainly plays the role of washing vegetables, but in fact, this is a technology bias (see the attached arguments). This technology bias guides people try to open the mouth of the basket, and cannot have the cover so as not to slow down the falling speed of the water flow and affect the placement of water, while the present invention is on the contrary, and overcomes this technical prejudice, located in export processing basket dense filter which accumulated a great deal of Group C impurities and some Group B impurities, objectively slowing the flow rate and affecting the placement of water which is random and irregular (affected to the distribution of impurities detained). But the washing effect improved significantly.

The method of washing vegetables that can split and separate impurities in this invention, can also be added with the following technical features: strengthen impurities closer to the center by making the bottom of the bucket into the low-center high-around and funnel-shaped to enhance the impurities to gather to the center, thereby strengthening the vortex flow on discharge of impurities; funnel describe rotating blade chamber can be set aside in order to strengthen the effect of water, can serve as the axis of rotation of the blade extending downward from the axis of rotation of the washing-basket. The preferred embodiment of the bottom of the washing-basket is flat or hopper.

The method of washing vegetables that can split and separate impurities in this invention, can also be added with the following technical feature: By making the bottom of the bucket into the low-center high-around and funnel-shaped to enhance the impurities to gather to the center, and this device is called the filter under the basket; of which the skeleton can be used as a supporting member of the basket, or not the support member. The density degree of meshes of the filter is to be able to prevent large leaves passing and without hampering the sediments' passing and discharge, within this range the meshes' size is changeable, preferably between aperture 2 mm to 5 mm.

The method of washing vegetables that can split and separate impurities in this invention, can also be added with the following technical feature: Motor drives the washing-basket to rotate, power of the motor may be transmitted to the basket from any position of the basket, and can be passed to the basket from above or below or side to the basket. When passing from the top to the basket, one of the passing method is selectively using the filter's skeleton in the basket's port as a transmission member, or may not choose to use the filter's skeleton in the basket's port as a transmission member.

The machine of the method of the present invention is a kind of vegetable washer that can split and separate the impurities in vegetables, including the basket in the washing-bucket with a sealing cover, in the chassis there is equipped with motor and the electronic control device that drive the washing-basket to rotate, it has features: this machine has following both A and B two technical features at the same time, or has any one of the following two technical features A and B. Feature A is that set the filter device near the port of the washing-basket, for the convenience of description, it can be called basket's port filter, or impurities blocker, or contaminant retention device. Basket's port filter is coated with dense filter screen, the aperture of the meshes as small as possible under the premise of water flowing through, preferably in the range between 0.1 mm to 1 mm. The subordinate concept of the stated "Settings" includes fixing the hinge, snap-fixing, fixing screwing, bolts, friction fixed, fixation pin plug, etc. The stated "near the port of the basket" means the range of in the washing-bucket and the height below the height of the washing-bucket's cover and above the end of the washing-basket, including the location of the port of the washing-basket or the inner wall of the washing-bucket or the inner surface of the cover. The effect is to make the water flow back into the washing-basket and continue loop and run, and stop the impurities flowing down to the washing-basket and continue looping and running, left the Group C impurities (and part of B impurities with the water rising) retained in the filter screen of the basket's port. The preferred program is that the filter mesh covers the above opening of the washing-basket. Any other equivalent transformation and the inevitable association revelation in this technique violates "infringement by equivalents" in "doctrine of equivalents". Feature B is that open an outfall of draining off water and pollution in the center or quasi-center of the bottom of the bucket, this outfall connected to the outside world by drain pipe, and the outfall may be coupled to the filter mesh when necessary, and the effect is that in the process of rotating to wash the basket and draining off water, the rotational speed of the center of the outfall is much faster than the surrounding, and can make a powerful vortex suction to suck and discharge a larger proportion of deposits of Group B impurities (sand and grit) in the bottom of the bucket, while making the vegetables which are relatively concentrated and stayed near the side wall of the washing-basket attracted to the center of the washing-basket with draining off water, to achieve rolling and flipping the vegetables, and prepare for the next time the basket begins to turn after the basket finishing inlet water and the centrifugal force takes fruits and vegetables to the edge of the basket, to achieve full rolling and flipping once more, and imitate human effects of fruits and vegetables flipping in the water. Like this every time water is changed, each vegetable is placed to another angle and changed to another face as the face of the water, and this flip is done every time after we change water and is unlike the violence when washing clothes in the washing, Any other equivalent transformation and the inevitable association revelation in this technique violates "infringement by equivalents" in "doctrine of equivalents". The stated the opening of the draining off water and sewage in the center of the bottom of the washing-bucket is a center opening which can be closed and opened, and the stated washing-basket is a basket that without shaft to be connected to the center of the bottom of the bucket; in the washing-bucket there is a special carrying device to carry washing-basket and special positioning device to limit the washing-basket's position and a special transmission mechanism will pass torque to the washing-basket, the "special" means "without shaft or shaft-seat connected with the center of bottom of the bucket".

The state two features of structures can exist in one vegetable washer at the same time, or there are just one exists in one vegetable washer. Of course, only when two features are equipped the vegetables can be cleaned to the most thorough.

The method of washing vegetables that can split and separate impurities in this invention, can also be added with the following technical feature: the bottom of the bucket is high-low center around the funnel-shaped bottom to strengthen impurities' discharge; funnel describe rotating blade chamber can be set aside in order to strengthen the effect of water, can serve as the axis of rotation of the blade extending downward from the axis of rotation of the washing-basket. In addition, the washing-bucket bottom of the bucket is provided a round of annular steps.

The method of washing vegetables that can split and separate impurities in this invention, can also be added with the following technical feature: set filter apparatus below the basket and above the drain pipe, the meshes' aperture of the filter are much sparse, as the standard of preventing the adoption of Group C impurities but passing through Group B impurities, within this standard the meshes' size is changeable, preferably between 2 mm to 5 mm. Filter frame under the basket can be used as a support member of the basket, and can be not the support member of the washing-basket.

The method of washing vegetables that can split and separate impurities in this invention, can also be added with the following technical feature: Motor drives the washing-basket to rotate, power of the motor may be transmitted to the basket from any position of the basket, and can be passed to the basket from above or below or next to the basket. When passing from the top to the basket, the method of passing can selectively use the filter's skeleton in the basket's port as a transmission member, or may not choose to use the filter's skeleton in the basket's port as a transmission member; When the rotation axis of the washing-basket or that of the tray of the washing-basket, and power input shaft that connected to the axis are a pair of crossed, which are connected by conventional binding mechanism well known in mechanical field, the subordinate of the stated well known binding mechanism well known includes: worm, universal joint, cross coupling, bevel gear, and so on.

The method of washing vegetables that can split and separate impurities in this invention, can also be added with the following technical feature:

According to the mature techniques in the conventional methods of the commercial vegetable washer, install generating an ozone device or a plasma generating device or ultraviolet generating device, etc., because the installation of these devices is well known mature technology, and is also currently commercially conventional practice of commercial dynamic vegetable washer, so are not written in the claims.

The Beneficial Effects

1: Solve the first problem that has been troubled the vegetable washer industry all the time: the problem of being unable to split and remove the Group C impurities.

2: Solve the second problem that has been troubled the vegetable washer industry all the time: the problem of being unable to split and remove the Group B impurities.

3: Solve the third problem that has been troubled the vegetable washer industry all the time: the problem of being unable to flip the fruits and vegetables sufficiently and existing dead angle of cleaning.

4: Since the drain opens in the center of the vortex, the sewage goes into the drains and can go forward like a rifle line while rotating and prevent the drain's blockage.

5: The program of solving the above problems does not need to add many complex mechanical electronics components, so it will not increase the difficulty of maintenance.

6: The program of solving the above problems does not need to add large manufacturing costs.

7: Overcomes the technical prejudice of spraying vegetables.

8: After washing vegetables by the vegetable washer of the prior art, we have to wash artificially last once or twice (to complete operation Y). This vegetable washer automatically completes the entire process of operation X and Y operation, without human intervention, so this change is a qualitative leap.

As long as we put these vegetables which are difficult to wash, such as leek, crown daisy chrysanthemum, edible amaranth, watercress, etc., respectively into the vegetable washer of this invention and the vegetable washer of the prior art to wash vegetables, the effect is immediately clear and distinction: vegetables, insect, weed, stale leaves, hair, all are left to the port of the filter of the basket, and no sediment remains in the bottom of the bucket. If comparing the fried food, we will see the outcome after tasting.

BRIEF DESCRIPTION OF THE DRAWINGS

Below in assembling conjunction with the accompanying drawings and the embodiment make further instructions for this invention.

FIG. 20 is the schematic diagram of separating and dividing the Group B impurities and Group C impurities in the vegetable washer in this invention.

FIG. 21 is the cycling diagram of the mixing of water flow and the Group B impurities all along in the vegetable washer in existing technology.

FIG. 22 is the physical picture of the structure of the bottom of the basket of the vegetable washer with the power below in existing technology.

FIG. 23 is the physical picture of the structure of the bottom of the basket of the vegetable washer with the power supra in existing technology.

FIG. 24 is the physical picture of the structure of the basket of the vegetable washer with the power supra in existing technology.

FIG. 25 is the assembling schematic diagram of the structure of the vegetable washer with the power below in existing technology.

FIG. 26 is the assembling schematic diagram of the structure of the vegetable washer with the power supra in existing technology.

FIG. 27 is the reinforcement of the bottom surface of all kinds of plastic chairs in the market.

Figure 1:
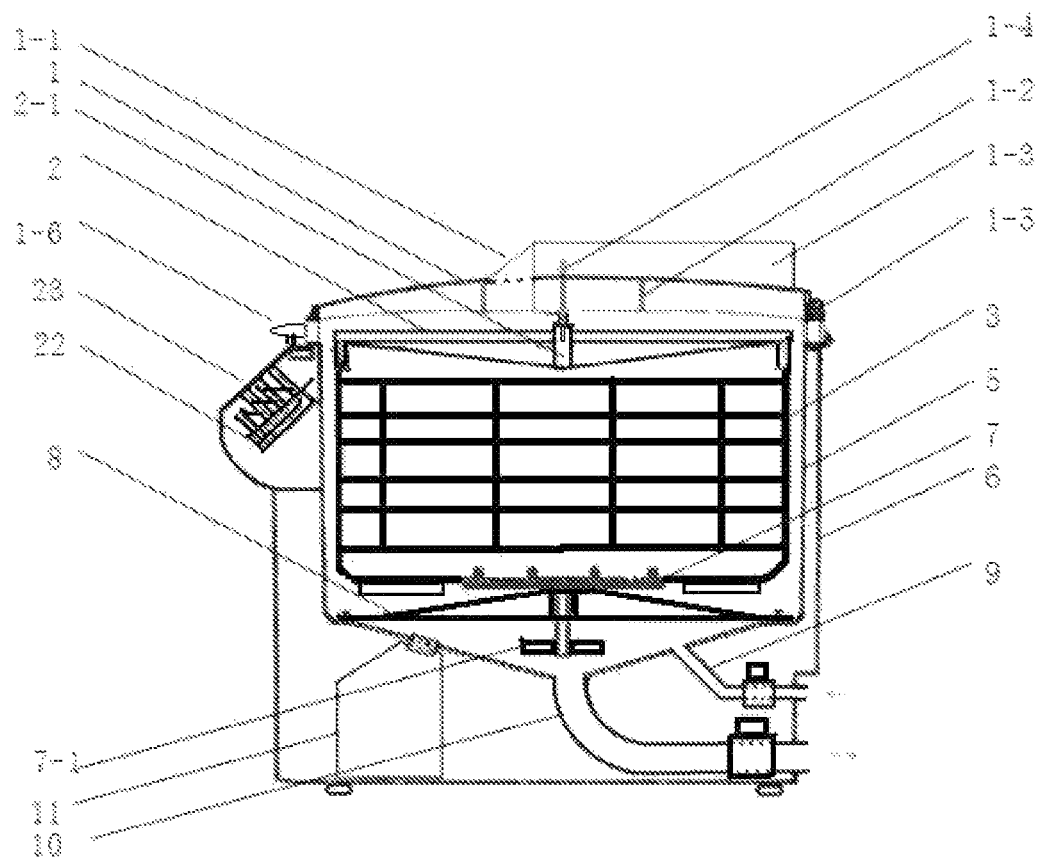
FIG. 1 is the schematic diagram of section view of the first embodiment in this invention.

IN THE PICTURE 1, the top cover of the washing-bucket; 1-1, filter chamber on the top cover; 1-2, well-shaped ribs and flap; 1-3, gearbox for gear motor assembly; 1-4, gear motor output shaft; 1-5, the hinge axis of the bucket's lid and body; 1-6, spring fastener of the bucket's lid and body;
2, filter of the basket inlet; 2-1, center shaft sleeve of the filter of the basket inlet; 2-2, spline key; 2-3, bolt of the filter of the basket inlet; 2-4, ring skeleton; 2-5, spoke; 2-6, filter screen; 2-7, spring; 2-8, spring pawl; 2-9, screw-thread of the filter of the basket inlet; 2-17, the hinge axis of the filter of the basket inlet and the washing-basket; 2-18, lock catch of the filter of the basket inlet;
3, washing-basket; 3-1, water repellent projections; 3-2, socket around the washing-basket;
4, gap of the washing-basket and washing-bucket;
5, washing-buckets;
6, the body;
7, tray assembly; 7-1, water paddle; 7-2, center shaft; 7-3, neck-head shaped plug;
8, filter under the basket; 8-1, the center tube bearing; 8-3, fixed bolt; 8-4, ring skeleton of the filter under the basket; 8-5, spokes of the filter under the basket; 8-6, strainer of the filter under the basket;
9, water inlet; 9-1, inlet valve assembly;
10, drain; 10-1, drain valve assembly;
11, ozone generator components;
12-1, radial positioning wheel; 12-2, axial positioning bearing wheels;
13, bottom steps;
14-1, pinion; 14-2, toothed belt; 14-3, gearwheel
15-1, small belt pulley; 15-3, big belt pulley
16, worm gear; 17, cardan shafts device; 18, ribs of all kinds of plastic products;
22, controller; 23, operation panel
101, small pulley on the motor; 102, shaft across upon the bottom of washing-bucket of the vegetable washer in existing technology; 103, big pulley; 104, sleeve set on the shaft 102; 105, Round table on projections in the center bottom of the washing-basket; 106, drain around the bottom of the bucket of the vegetable washer in existing technology; 107, water inlet
201, central projection shaft of the washing-bucket of the vegetable washer in existing technology; 202, the shaft set on the center bottom of the washing-bucket of the vegetable washer in existing technology

DETAILED DESCRIPTION OF THE PREFERRED EMBODIMENT

In the embodiment of FIG. 1 to FIG. 8, in the cavity of the shell 6 of the body, the lower part of the cavity is used to set a variety of electrical and equipment of inlet and drainage of water, and the upper cavity is used to set the washing-bucket 5. In the cavity of the washing-bucket 5, the upper cavity is used to receive the washing-basket 3 and the filter 2 of the basket's port, and the lower cavity is provided with tray assembly 7 and the filter 8 under the basket.

The projection of the filter 8 under the basket is round, and the size of the projected area is equal to that of the cross sectional area of the washing-bucket; filter with the skeleton of umbrella-shaped under the basket including: a vertical center tube bearing 8-1, the ring skeleton 8-4 around periphery, the spoke 8-5 is between the bearing and skeleton, and the spokes can have one or multilayer (in order to increase strength, one point in the spoke and one point in the sleeve can be re-welded steel bars with supporting, not shown in this case to be straightforward). The cone surface surrounded by the ring skeleton and spoke fixing drape filter 8-6, of course, the size of the projected area of the filter and the size of the cross-sectional area of the washing-bucket are also quite cavity; Filter 8 is fixed in the bottom of the washing-bucket at the mouth of the funnel under the basket by the fixing bolts 8-3. In this case the filter under the basket is also a support member, telescoped together by the tray assembly 7 to support the washing-basket. The stated tube bearing 8-1 may be instead by the tubular sleeve and the plane bearing fixed in the pipe's opening.

The head-neck shaped bolt 7-3 on the tray assembly 7 holes up into the pin holes in the bottom of the washing-basket, and the pin holes are round holes in the middle and strip holes on both sides of the arc, space of the round holes work with the head-neck shaped bolt, so that the washing-basket can be easily separated from the tray removed or re-placed in the tray, and transmit the rotation torque through the plug; The central tray 7-2 of the tray assembly goes through the central bearing 8-1 of filter 8 under the basket, put down into the funnel-shaped cavity of the underpart of washing-bucket cavity, and the central axis 7-2 and the central bearing 8-1 cooperate interference. The end of the central axis 7-2 is fixed with flaky dial water slurry 7-1. The stated tray is permeable hollow.

The horizontal projection of the filter 2 is circular, and the size of the projected area is equal to that of the washing-basket's inlet; the filter in the inlet has an inverted umbrella-shaped frame, including: a vertical straight tubular sleeve 2-1, the ring skeleton 2-4 around periphery, the spoke 2-5 is between the sleeve and skeleton, and the spokes can have one or multilayer (in order to increase strength, one point in the spoke and one point in the sleeve can be re-welded steel bars with supporting, not shown in this case to be straightforward). The cone surface surrounded by the ring skeleton and spoke fixing drape filter 2-6, of course, the size of the projected area of the filter and the size of the cross-sectional area of the washing-bucket are also quite; There is bolt 2-3 underneath the outer periphery of the ring skeleton. When working, filter 2 in the basket's port covers on the mouth of washing-basket 3, around the basket's mouth are several jacks 3-2, which cooperates with plug 2-3. In this case the filter in the basket's mouth is also a power transmission component, receive torque power from the top shaft 1-4 through the sleeve 2-1, and pin inserted to the jacks 3-2 around the mouth of the basket through the plug 2-3 to pass the torque force to the basket.

Leave proper clearance 4 between the inner wall of the washing basket 3 and the washing-bucket 5, the up cover 1 of the washing-bucket 5 is hinged with the body through the hinge axis 1-5, to achieve the lid's opening and closing through the rotation of the hinge axis, to achieve that the bucket closes the cover by spring deduction 1-6, around the lid sets a waterproof sealing tape. Above the lid sets a gearbox for gear motor assembly 1-3 to hold the gear motor, output shaft 1-4 of the gear motor goes through the cover of the underside of the lid and the head inserts into the central filter sleeve 2-1 of basket's opening, shaft and sleeve are connected with spline lenient 2-2. Shaft 1-4 drive sleeve 2-1 to rotate so as to drive the filter at the mouth of the basket.

In the cavity of the body shell 6, the underpart cavity is set with water inlet 9 and the inlet valve assembly 9-1, and the inlet communicates with the washing-bucket, so that water can automatically draw into the washing-bucket 5 under the control of the controller. There is water level controller to monitor water level in the cavity (for simplicity, not shown in the picture).

In the cavity of the body shell 6, the underpart cavity is set with drain 10 and the drain valve assembly 10-1, and the drain is connected with central bottom of the washing-bucket, or quasi-center. In this case the lower part of the washing-bucket is funnel-shaped, and the center is the lowest, so it can form effects of powerful vortex sewage.

The upper part of the front of fuselage has an operation panel 23, in which there is corresponding controller 22. By operating the control panel buttons, to achieve the operation of the controller. The controller can automatically control water inlet and drainage and the cleaning procedures.

Figure 2:
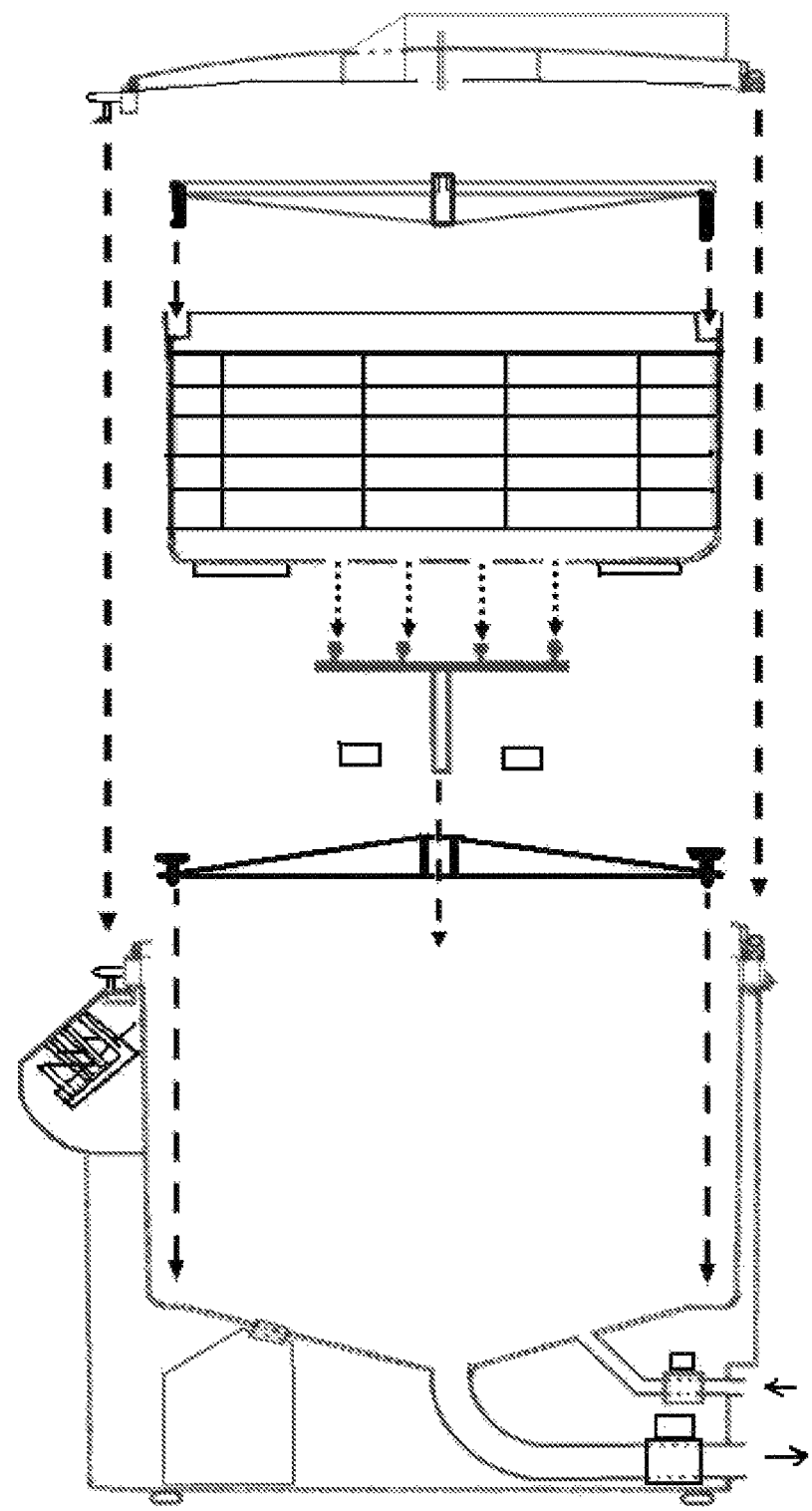
FIG. 2 is the assembling schematic diagram of the first embodiment in this invention.
Figure 3:
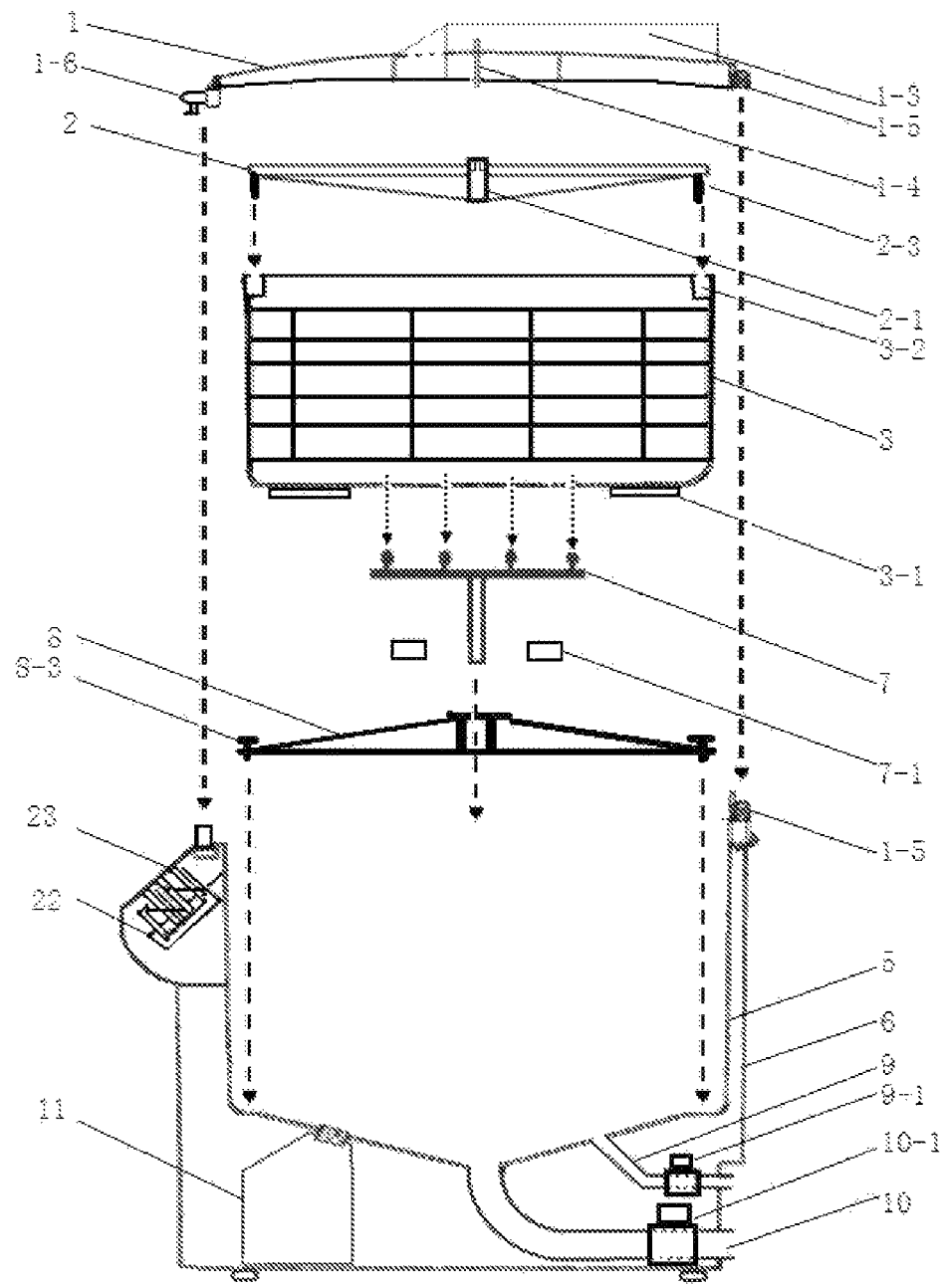
FIG. 3 is the labeling diagram of all parts in the assembling schematic diagram of the washing-bucket and chassis of the first embodiment in this invention.

See FIG. 2 and FIG. 3, in order to be more conducive for understanding the embodiment, FIG. 2 provides the assembly diagrammatic drawing of the first embodiment of the present invention, FIG. 3 is the label of all parts in FIG. 2 (for simplicity, parts of this specification schematic sectional drawing show not symbols).

Figure 4:
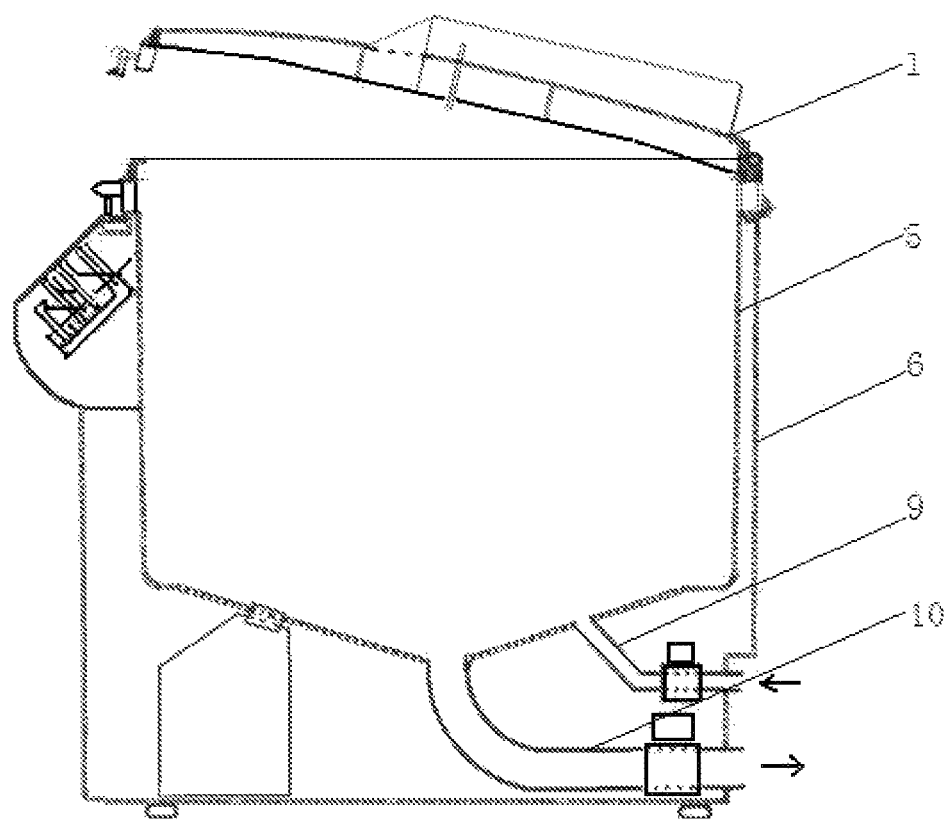
FIG. 4 is the schematic diagram of the washing-bucket and chassis of the first embodiment in this invention.

FIG. 4 is the schematic of the washing-bucket and chassis of the first embodiment of the present invention, that is the schematic that the filter in the basket's opening and the washing-basket and filter under the basket and tray assembly have not been installed, and in the figure the snap hook 1-6 of the lid and the bucket body does not catch live, so the lid bounce a certain angle due to the action of the spring hinge axis 1-5.

Figure 5:
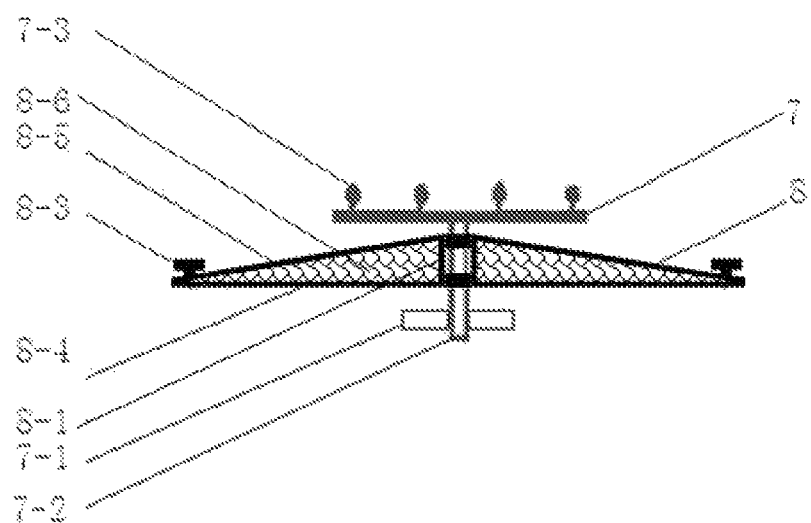
FIG. 5 is the schematic diagram of the filter under the basket and multifunctional trays combination of the first embodiment in this invention.
Figure 6:
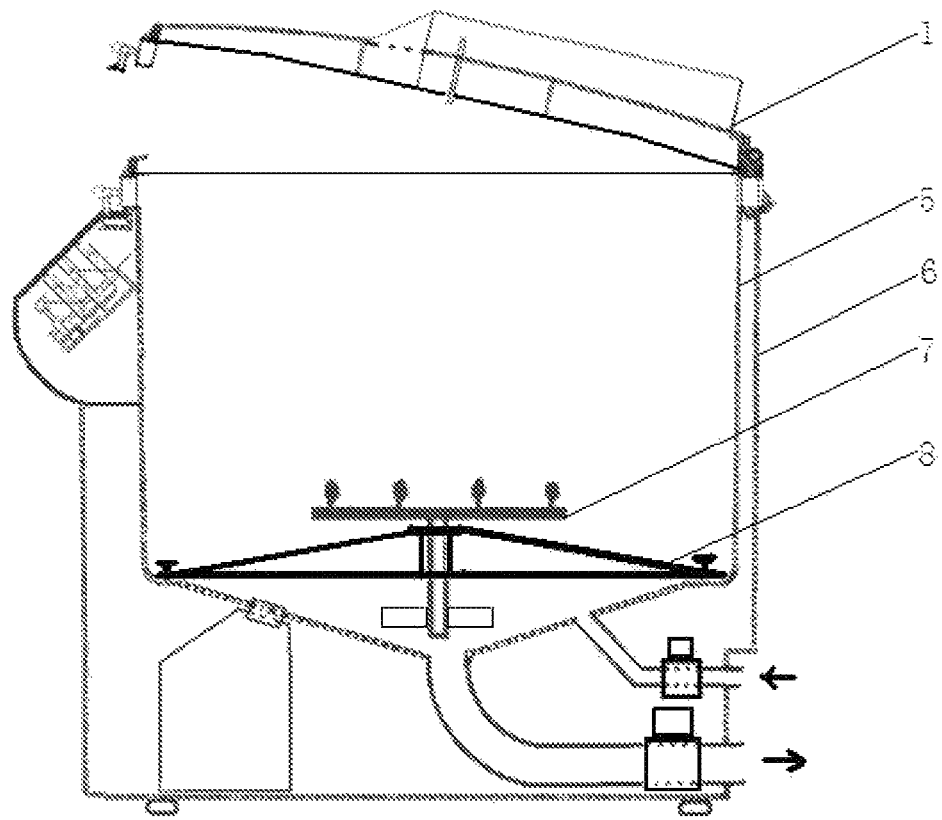
FIG. 6 is the schematic diagram after the filter under the basket and multifunctional trays combination installing on the washing-bucket of the first embodiment in this invention.

See FIG. 5 and FIG. 6, in order to be more conducive for understanding the embodiment, FIG. 5 provides the schematic drawing of the combinations of the filter under the basket and the multifunctional tray of the first embodiment of the present invention. FIG. 6 is a schematic drawing that FIG. 5 is installed in FIG. 4 (for simplicity, the filter mesh under the basket are not shown).

Figure 7:
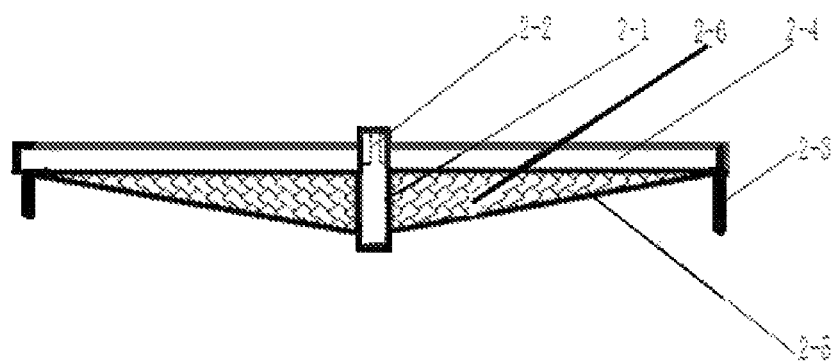
FIG. 7 is the schematic cross-sectional diagram of the filter in the basket's port of the first embodiment in this invention.
Figure 8:
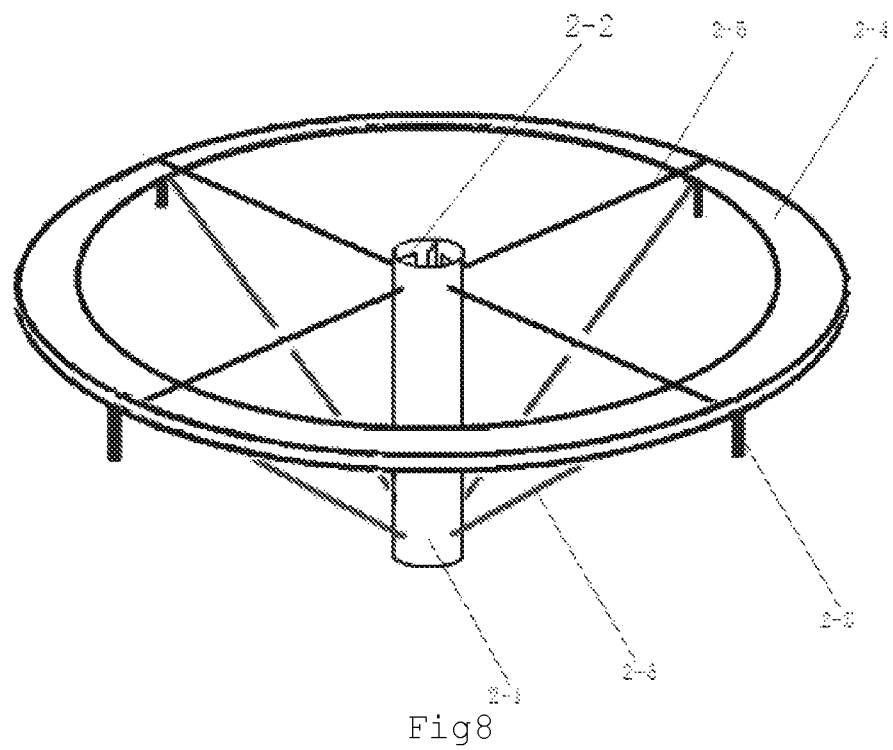
FIG. 8 is the schematic diagram of section view of the filter in the basket's port of the first embodiment in this invention.

See FIG. 7 and FIG. 8, FIG. 7 is a cross-sectional schematic view of the filter in the basket's inlet of the first embodiment of the present invention, and in the drawing the aperture of the filter screen is not painted in proportion, but as a hint, and the filter screen of the basket's inlet in the other figures of the first embodiment are not shown in addition to FIG. 7, FIG. 8 is a stereoscopic schematic view of the filter in the basket's inlet of the first embodiment of the present invention.

When working, put fruits and vegetables into the basket, and put latch 2-3 of the filter of the basket inlet insert into the jack 3-2 of washing-basket inlet to make filter 2 of basket inlet cover the basket inlet. Then cover with the lid, at the same time, slow down the motor's output shaft 1-4 can be easily inserted the sleeve 2-1. Then open the inlet valve, under the control of the water level controller draw water to a predetermined level and close the backward valve. Then the motor starts, at the same time the output shaft 1-4 of the gear motor rotates drive sleeve 2-1 to rotate through the loose big gap splines 2-2 so as to drive the filter of the basket inlet 2 to rotate. Because latch 2-3 of the filter of the basket inlet insert down to the jack 3-2 of washing-basket inlet to drive the whole washing-basket to rotate. And because the head-neck shaped bolt 7-3 on the tray assembly 7 holes up into the pin hole associated with it in the bottom of the washing-basket so that the washing-basket drive the tray to rotate. Because the tray has the downward extending shaft 7-2, the shaft can be synchronized with the rotation of the housing in the circumferential direction, so that the two pieces of water repellent sheet that are fixed to the shaft's end rotate synchronous and repellent the water; and because the shaft 7-2 and the central tube bearing 8-1 of the filter under the basket are interference fit, the shaft is fixed with the bearing 8-1 in the axial direction, while the filter under the basket is fixed by the screw 8-3 to the bucket body, therefore in the axial direction, the tray is fixed to the bucket body, and also play a supporting role to the washing-basket.

With the rapid rotation of the washing-basket, fruits and vegetables in the basket as well as the water do the centrifugal movement, and fruits and vegetables move to the basket's side and was blocked by the basket's walls and stay near the side wall, while the water flow is flung by the centrifugal forces from the washing-basket to the gap 4 of basket and bucket, then rise to the top of the basket, then water is drawn out with Group B impurities and Group C impurities, and part of Group B impurities sink to the end of the bucket, and the rest Group B impurities and Group C impurities that are thrown together with the rising water flow, rises to the above of the basket, and are hampered by the top lid or the erected retaining ring above the bucket and down to the center of the filter mesh in the basket's mouth, and these impurities cannot pass through the dense mesh and retained in the filter mesh in the basket's mouth, to complete Y operation. While the water flow passes through the filter strainer of the basket ports and continue to fall into the basket, and then, be flung to the gap of washing-basket and washing-bucket by the centrifugal force again, like this cycling flow, each cycle of every stream of water goes through the gap of the vegetables in washing-basket, to form rapidly relative motion with the surface of the fruit and vegetable, and form friction, with the surface of fruits and vegetables, produce friction to impurities and vegetable spin off to complete the X operation. The most crucial point is that each cycle of every water flow takes Group B impurities and Group C impurities mixed up with vegetables out of the washing-basket, and into the filter of basket's mouth. Then, these Group B impurities and Group C impurities stay in the filter of basket's mouth. That is to say, these impurities leave the basket and cannot comeback into the basket, never return, they will be no return to the vegetables if leave the vegetables. In this example set the vegetable washer's basket 200 revolutions per minute, a program of rotating with 20 minutes, about 4000 rpm, even if every turn brings a little bit of impurities (Note: no return impurities, there will not fall back into the basket if impurities come up), a little bit in 4000, it is not possible without cleaning up the impurities. Impurities in washing-basket is reducing every second, this second are less than last second, the next second are less than this second, and all gradually lien to the filter of the basket's mouth. The water flow not only plays the role of water erosion, but also plays the role of scouring, while by the vegetable washer of existing technology, water only plays the role of scouring.

While in the vegetable washer of existing technology, because there is no filter at the mouth of the washing-basket, impurities are thrown from the basket's side, up to the basket's opening, and spray down to the basket from the basket's opening, no matter how many times water cycle up and down and inside and outside, these Group C impurities and part of Group B impurities also cycle so many times along with the water cycling. Water in washing-bucket is discharged, Group C impurities and part of Group B impurities are still mixed in the vegetables, especially worse to the situation of leafy. Therefore, in video advertising of vegetable washer in the existing technology, we have never met that people take these vegetables such as leek garden chrysanthemum amaranth watercress with much more impurities for examples to wash, and often see them take apples peach lettuce and other ingredients that are easy to clean.

The filter of the basket inlet has the function of blocking impurities to backflow and storing up impurities, so it is also known as impurities blocker, or contaminant retention device.

In this embodiment, the control panel 23 is slated to have many time plans and speed options available to suit the needs of different user's preferences and different fruits' and vegetables' needs. Scheme in this case is set for a total of 24 minutes through the wash process, four times running. Each time the water inflow takes one minute and then rotating washing takes 4 minutes and then begin to open the drain valve while rotating water drain for about one minute to complete the washing one time. The whole process carries on a total of four times in the water—wash—drainage. In four minutes of the rotating washing it can cross clockwise rotation and counterclockwise rotation.

Now discuss the feature of the sixth minute work in this case: use the method of cleaning of the vortex center to remove the sewage water and impurities. The controller opens the drain valve according to the set procedures, then washing-basket continues to rotate in a clockwise direction, the flow continues to rotate in a clockwise direction, and the water forms vortex in the center of the bucket spinning flowing out of the washing-basket and is discharged out of the washing-bucket by the drain. Since the drain 10's opening in the bottom center of the washing-bucket 5, then the rotational speed of the water near the mouth of the drain is quite quick, and quickly roll Group B impurities which are deposited in the funnel-shaped bottom of the bucket into the drain, and water continue to rotate after going into the drain due to inertia will, rotating and going forward, which acts like a bullet having a rifle movement inside the barrel, can remove Group C impurities more thoroughly to the outside world, and eliminate sand accumulated nearby rubber plug in the drain valve to avoid leakage.

Also, before the drain valve open, there are parts of heavy Group B impurities, when rotating to the drain's opening at the center bottom of the bucket, having dropped to the drain to wait for the discharge, that is to say, the drain provides indwelling space for Group B impurities and becomes indwelling devices of Group B impurities. In this way, when the washing-basket is rotating and working, Group B impurities in washing-basket is reducing every second, this second are less than last second, the next second are less than this second. While the vegetable washer in existing technology, because there is no opening in the bottom center of the bucket, most of Group B impurities (except parts with water rising and cycling) accumulate center around axis 102 in the bottom.

The vegetable washer of existing technology, since in the central bottom of the bucket sets the rotation axis, the drain's opening can only be set at the edge of the bottom of the washing-bucket, and it fails to achieve this effect, see FIG. 22 and FIG. 23. There exist four defects in this bucket-bottom structure of the existing technology: First, because of the water's rotation large number of Group B impurities accumulate in the central area of the bucket's bottom (near the axis of FIG. 22 or near the shaft seat of FIG. 23), these impurities cannot be discharged from the drain provided in the drain edge of the bucket's bottom. Second, the sand particles long-term accumulating in the vicinity of the axis are likely to be involved in the gap of shaft and waterproof cup, causes cup scratches and scratches causes sealing leakage. Third, the hydrodynamic characteristics of the sewage flowing to the center outlet while rotating cannot be used to take away the impurities, particularly Group B impurities. Fourth, water flow cannot be discharged by rifled type moving after going into the drain pipe, to the accumulation of sand flowing through the drain valve when in the vicinity of the rubber plug in the drain valve, which easily lead to a rubber stopper loose relationship, leading to water leakage.

As we all know, the cross-section of the washing-bucket's chamber of the vegetable washer and that of the washing-basket are a pair of concentric circles, so the shaft of the washing-basket of course goes through the center of this pair of concentric circles. Therefore in the central bottom of the vegetable washer of existing technology there sets the rotating shaft go through upward (see FIG. 22) or set shaft seat at the center bottom of the bucket (see FIG. 23) is also a matter of course, nothing wrong; this setting is an inevitable association of a staff in this technology. And the innovative thinking and creative work of the present invention lies in the irrational setup program that abandons the conventional. Open the outlet in the bottom center of the bucket filled with water, and the sewage effect has been improved essentially. Coupled with the bottom of the bucket made as funnel-shaped, sewage is very thorough.

Now discuss the operating characteristics of sixth minute to eighth minute in this case: the fruits and vegetables make periodic heart movement and centrifugal movement, in order to achieve the placement angle of flipping and flapping fruits and vegetables in the basket. The sixth minute, the controller opens the drain valve according to the set procedures, then washing-basket continues to rotate in a clockwise direction, and the water flow continues to rotate in a clockwise direction, due to the opening of drain 10 opens in the center bottom of the washing-bucket 5, the water rotates to the center from all around, and form vortex in the center of the bucket spinning out of the washing-bucket and discharge outside by the drain. The water flow also drives fruits and vegetables to move towards the center of the basket (including scrolling and flipping). Until the water is drained, close the drain valve. Fruits and vegetables changes from the "relatively concentrating remain near side walls in the washing-basket" to "relatively concentrating remain near the center in the washing-basket." The seventh minute, according to set procedures the inlet valve opens the second time, penetrating water under the control of the water level controller to a predetermined level and then backward valve is closed. Next the eighth minute, motor starts, then output shaft 1-4 of gear motor rotates and goes through splines 2-2 of a large loose gap driving sleeve 2-1 to rotate so as to drive the filter 2 of the basket's inlet to rotate. Because latch 2-3 of the filter of the basket inlet insert down to the jack 3-2 of washing-basket inlet to drive the whole washing-basket to rotate. Thereby drive water repellent plate 7-1 rotates together to repellent, thereby drive the whole bucket of water in the washing-bucket to rotate together. With the rapid rotation of the washing-basket, fruits and vegetables in the basket as well as the water do the centrifugal movement, and fruits and vegetables move to the basket's side and was blocked by the basket's walls and stay near the side wall, and back to the position before the original drainage. The same of the process of centrifugal movement and the process of the concentric movement is the process of fruits and vegetables sufficiently rolling and turning, to achieve the effect of replacing manual turning fruits and vegetables in the water. Like this every time water is changed, each vegetable is placed to another angle and changed to another face as the face of the water. And this flip is done every time after we change water, and is unlike the violence when washing clothes in the washing, so it will not cause harm to fruits and vegetables.

The stated output shaft 1-4 and sleeve 2-1 use a large loose gap key, for example, only four or three teeth, etc. are for convenience when you put the lid the shaft 1-4 can be easily inserted into sleeve 2-1, as long as achieving this purpose and can play a driving role, it can be OK in any other conventional mechanical solutions. For example gear transmission cross shaft surface can be all right in the field of mechanical.

Whether the stated washing process to be introduced into the ozone or not, there are two options for users to choose on the control panel 23. If desired, may according to the program automatically inlet ozone into the washing-bucket 5 by the ozone generator 11 within a predetermined time. Discharge excess ozone residue through the filter chamber 1-1.

Left the proper clearance 4 between the inner wall of the washing-basket and washing-bucket as water flow's rising channel. Now that it is the channel, the diameter is the same as a water pipe, and the width of the channel can only be determined based on the desired flow rate and flow speed which are affected by the size of the bucket and speed of the washing-basket's rotation. Therefore, it cannot have a uniform value, such as a same number, is not the best choice of two washing-buckets of a small diameter and a big diameter. But by the logic of the relevant amounts described in this paragraph, we can calculate the value for the optimum gap to specific examples step by step through the experimental.

Figure 9:
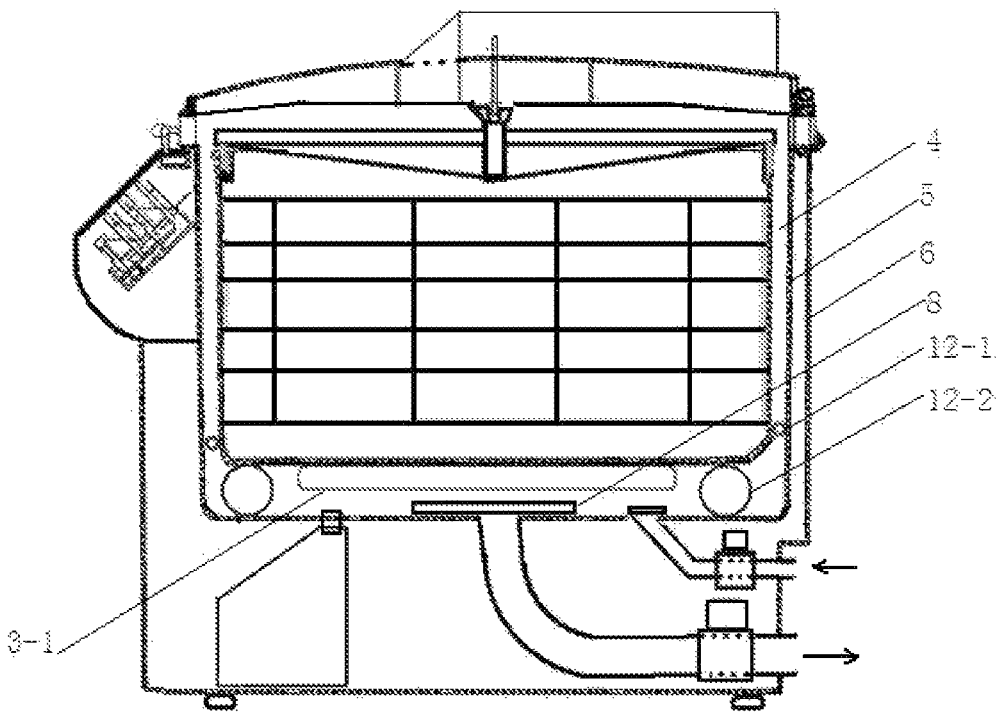
FIG. 9 is the schematic diagram of section view of the second embodiment in this invention.

FIG. 9 is the second embodiment of the present invention. The difference between this embodiment and the embodiment 1 is: the filter 8 under the basket is a disc-shaped planar filter, fixed in the center of the bottom of the bucket; the washing-bucket's bottom is flat; around the washing-basket is mounted three or more wheels 12-1, playing the role of a radial positioning; when the washing-basket rotating, use the rolling friction of the wheel with the inner wall of the washing-bucket to avoid the sliding friction and collision of the basket with the inner wall of the bucket, while allowing the washing-basket's taking and placing, a spherical square wheel is used in the figure; bottom surface of the washing-basket is mounted a pulley 12-2, plays the role of carrying the washing-basket, together with the lid and the filter of the basket port define the axial position of the washing-basket, spherical casters are used in the figure; a downward projecting elongate repellent article 3-1 in the end of the basket, the allocation of water can have multiple pieces, forming a cross-shaped cross or X-type or can also be made into rice-shaped swastika-shaped (refer to seeing from bottom angle) and so on.

Figure 10:
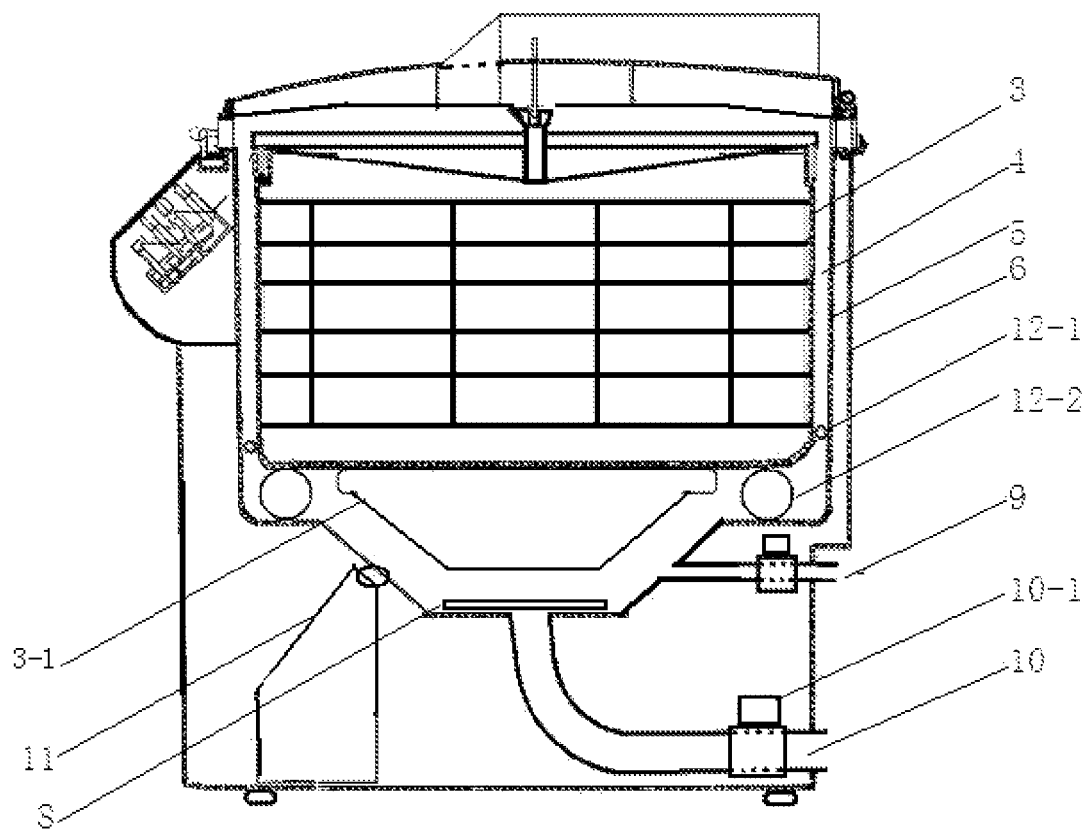
FIG. 10 is the schematic diagram of section view of the third embodiment in this invention.

FIG. 10 is the third embodiment of the present invention. The difference between this embodiment and the embodiment 2 is: the bottom of the bucket is Truncated cone shape.

Figure 11:
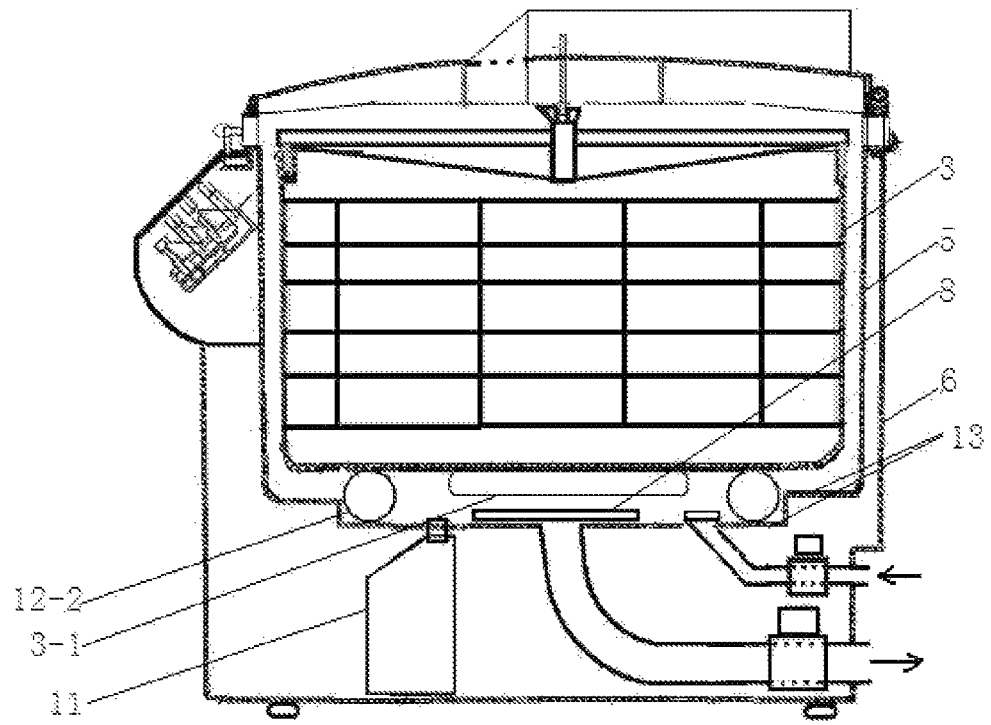
FIG. 11 is the schematic diagram of section view of the fourth embodiment in this invention.

FIG. 11 is the fourth embodiment of the present invention. The difference between this embodiment and the embodiment 2 is: in the bottom of the bucket there is an annular step 13, the positioning load wheels 12-2 just falls on the face of the step, the vertical face of the step plays the role of positing to the radial position of the basket, which eliminates positioning wheel around basket; filter 8 under the basket is a flat disc filter fixed to the drain port.

Figure 12:
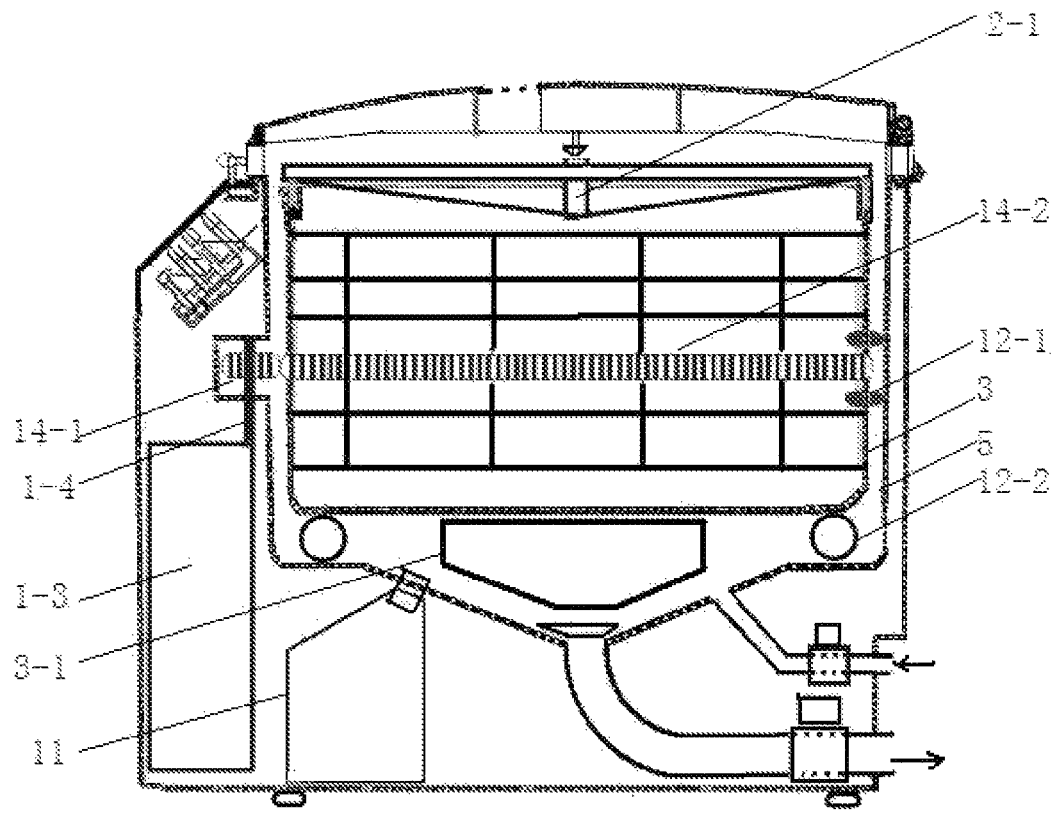
FIG. 12 is the schematic diagram of section view of the fifth embodiment in this invention.

FIG. 12 is the fifth embodiment of the present invention. The difference between this embodiment and the embodiment 1 is: Power comes from the side of the basket, gear motor assembly 1-3 is fixed in the bottom side of the chassis 6, output shaft 1-4 goes up through the grooves on the sides of washing-bucket, and interference connection with gear 14-1. The groove is called gear compartment of the bucket's side, and the outer periphery of the washing-basket wall has a circle of rack waist, called tooth belt 14-2, the teeth of which engaged with those of gear 14-1, in order to achieve that motor driving the washing-basket to rotate; around the washing-basket is mounted three or more wheels 12-1, playing the role of a radial positioning; when the washing-basket rotating, use the rolling friction of the wheel with the inner wall of the washing-bucket to avoid the sliding friction and collision of the basket with the inner wall of the bucket, while allowing the washing-basket's taking and placing, a spherical square wheel is used in the figure; bottom surface of the washing-basket is mounted a pulley 12-2, plays the role of carrying the washing-basket, and together with the lid and the filter of the basket port define the axial position of the washing-basket, spherical casters are used in the figure; a downward projecting elongate repellent article 3-1 in the end of the basket, the allocation of water can have multiple pieces, forming a cross-shaped cross or X-type or can also be made into rice-shaped swastika-shaped (refer to seeing from bottom angle) and so on. In addition, the center of the lid has downward extending resilient idle lever pressed the center sleeve 2-1 of the basket's inlet filter, serving to prevent the beating of the basket inlet filter without affecting its rotation (for simplicity, in this specification gear plate and pulley plate are not processed for cross-sectional view).

Figure 13:
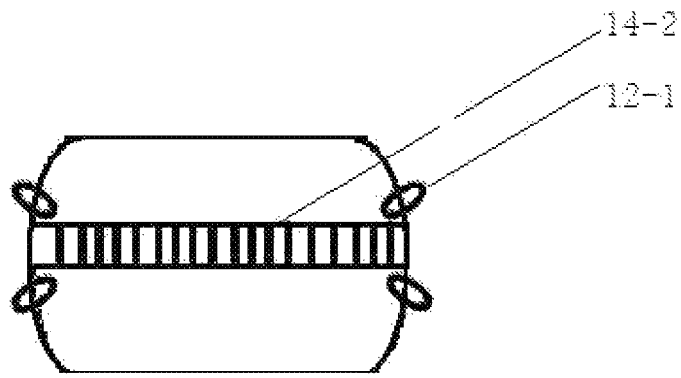
FIG. 13 is the schematic diagram of another equivalent transformation of the washing-basket of the fifth embodiment in this invention.

FIG. 13 is another equivalent transformation of the washing-basket of the fifth embodiment of the present invention The washing-basket is bulging in waist, and the entire basket was drum, and teeth belt locates in the bulged position.

Figure 14:
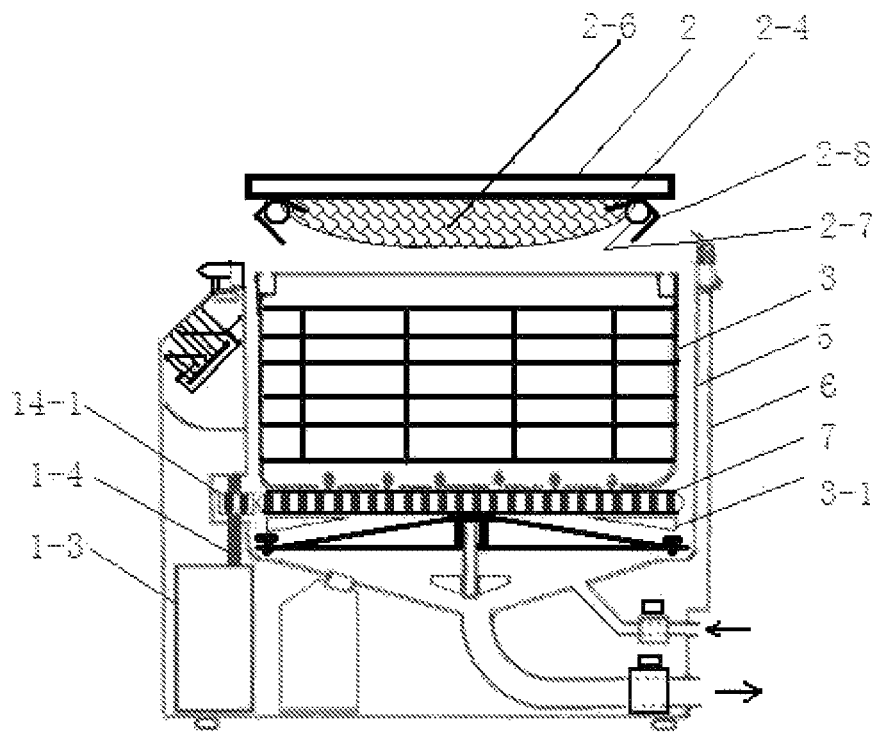
FIG. 14 is the schematic diagram of section view of the sixth embodiment in this invention.

FIG. 14 is the sixth embodiment of the present invention. The difference between this embodiment and the embodiment 1 is: the power is from the under part of the basket, and gear motor assembly 1-3 is fixed in the bottom side of the chassis 6, output shaft 1-4 goes up through the grooves on the sides of washing-bucket, and interference connection with gear 14-1. The groove is called gear compartment of the bucket's side, in FIG. 1 the area of multi-purpose tray 7 in the bottom of the basket is enlarged to the degree in contact with the gear 14-1 and may be engaged with each other in this embodiment, of course, the entire side surface of the tray are gears which are engaged with gear 14-1. We can also take the whole plate of the tray as a big gear; under the plate is downward projecting elongated repellent strip 3-1, which can be multiple, arranged to a lap of radially. In addition, in this embodiment the filter of basket's port 2 is a circular flat filter, and a number of spring claws 2-8 are set around the filter, in the action of the spring 2-7, the claws open to the outer circumference, when using them, put the end of claws into the basket mouth, snap the filter in the mouth of the washing-basket a little harder, claws 2-8 are pressed into the basket and clamp the basket wall to achieve fixing them. The figure is the schematic cross-sectional view of four claws structure (for simplicity, the lid of the washing-bucket is not shown).

Figure 15:
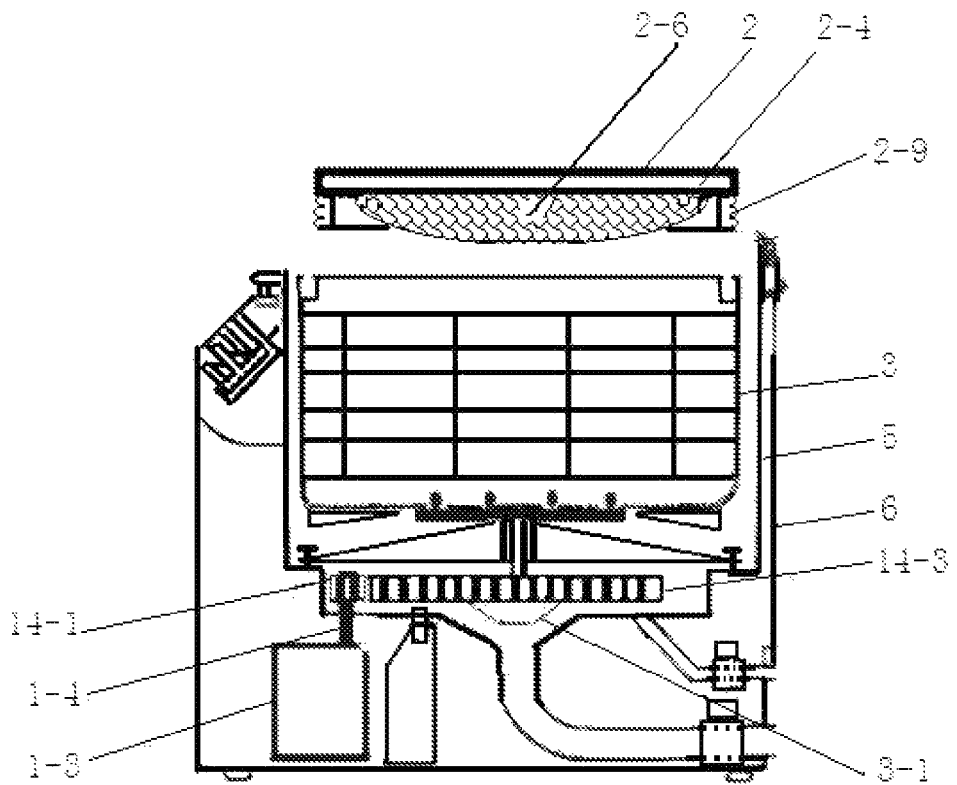
FIG. 15 is the schematic diagram of section view of the seventh embodiment in this invention.

FIG. 15 is the seventh embodiment of the present invention. The difference between this embodiment and the embodiment 1 is: the power is from the under part of the basket, and gear motor assembly 1-3 is fixed in the bottom side of the chassis 6, output shaft 1-4 goes up through the grooves on the sides of washing-bucket, and interference connection with gear 14-1. In the place of installing water paddle 7-1 in FIG. 1, the end of the shaft, instead for installing big gear 14-3 engaged with big gear 14-1, under the big gear is downward projecting elongated repellent strip 3-1 the allocation of water can have multiple pieces, forming a cross-shaped cross or X-type or can also be made into rice-shaped swastika-shaped (refer to seeing from bottom angle) and so on. The sated large gear is permeable and hollow. In addition, in this embodiment the basket inlet filter 2 is a shallow cylindrical frame, above coats filter to form the frame of shallow cylindrical, and there is a lap of screw thread 2-9 around the outer circumference of the cylinder which can rotate and secure to the washing-basket. (There are the screw threads working with that screw thread around the inner surface of the basket). (for simplicity, the lid of the washing-bucket is not shown).

Figure 16:
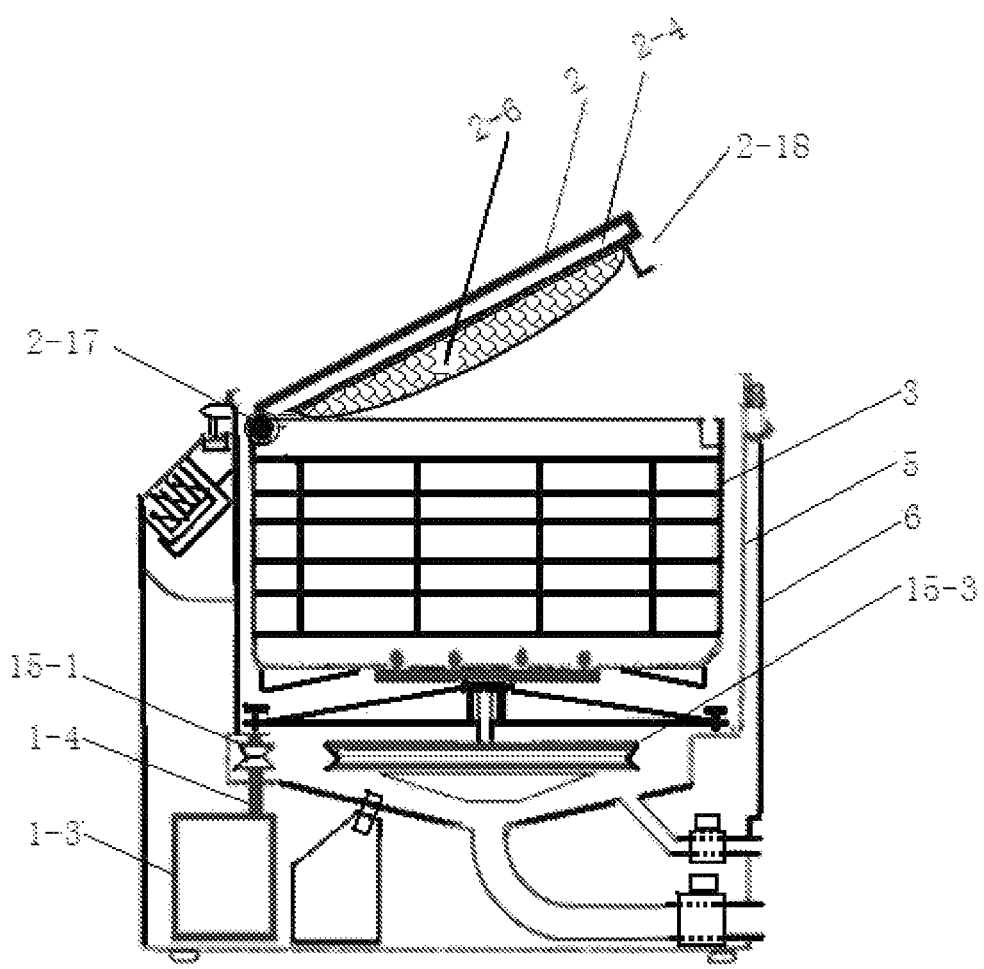
FIG. 16 is the schematic diagram of section view of the eighth embodiment in this invention.

FIG. 16 is the eighth embodiment of the present invention. The difference between this embodiment and the embodiment 7 is: in FIG. 15 gear 14-1 and big gear 14-3 are changed to be pulley 15-1 and large pulley 15-3 in this case. For simplicity, the belt is not drawn in the figure. (For simplicity, the lid of the washing-bucket is not drawn). In addition, in this embodiment the basket inlet filter 2 is concave-shaped member formed from an annular frame 2-4 coated filter 2-6. It is hinged to the washing-basket, by rotating hinge axis 2-17 to achieve open and close, and there can be fastened 2-18 locking the washing-basket.

Figure 17:
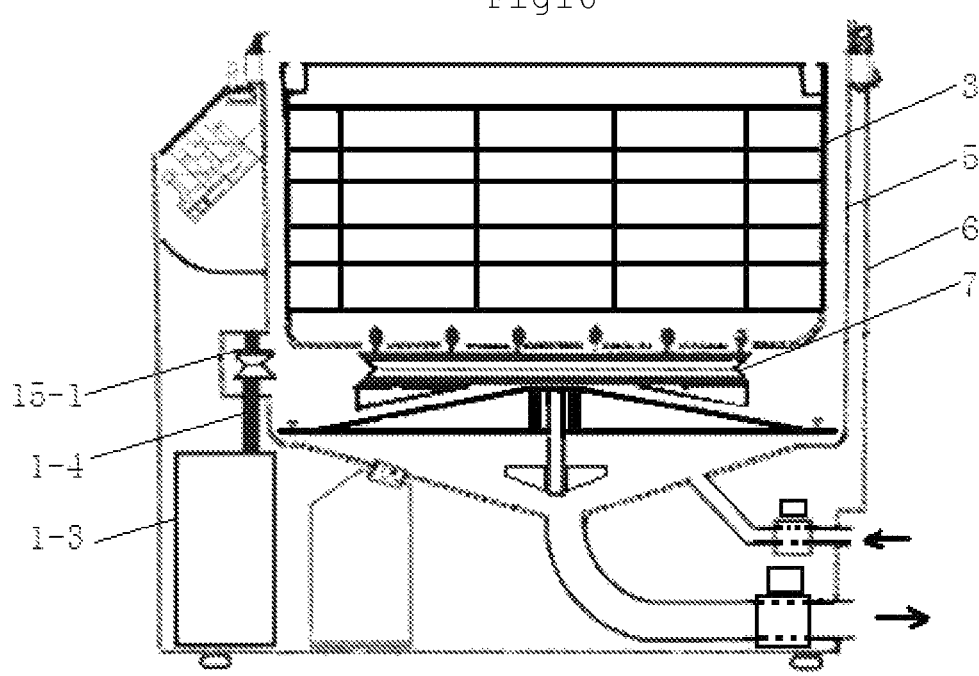
FIG. 17 is the schematic diagram of section view of the ninth embodiment in this invention.

FIG. 17 is the ninth embodiment of the present invention. The difference between this embodiment and the embodiment 6 is: in FIG. 14 gear 14-1 and gear-type tray 7 are changed to be pulley 15-1 and pulley-type tray 7 in this case. For simplicity, the belt is not drawn out in the figure. (for simplicity, the lid of the washing-bucket is not drawn out).

Figure 18:
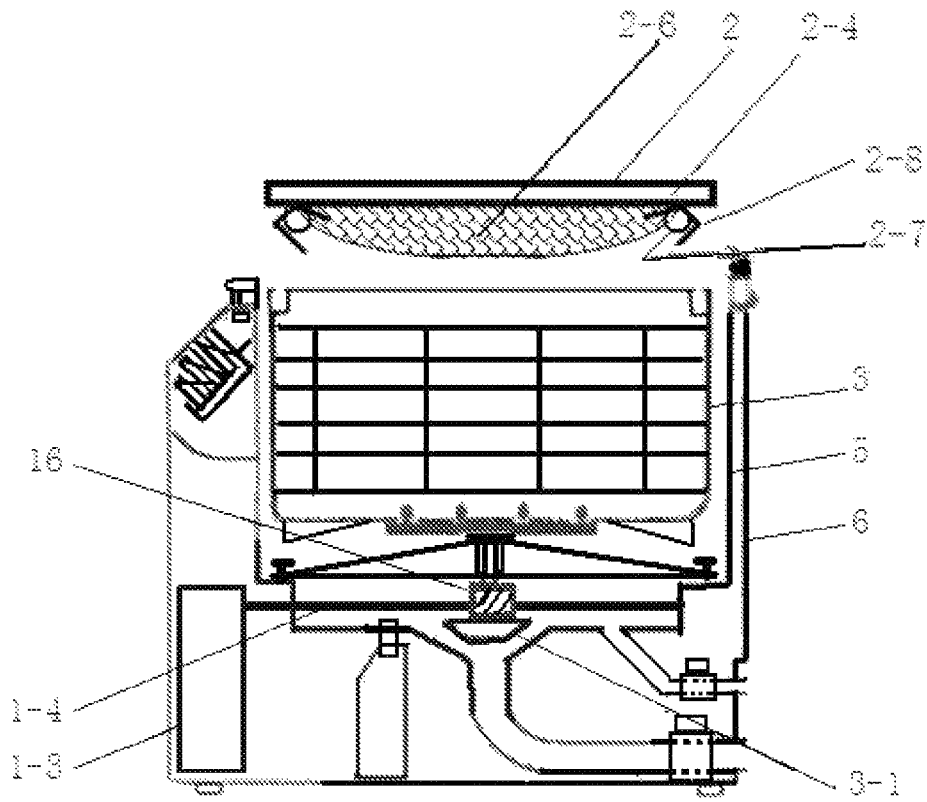
FIG. 18 is the schematic diagram of section view of the tenth embodiment in this invention.

FIG. 18 is the tenth embodiment of the present invention. The difference between this embodiment and the embodiment 7 is: intermediate section of the output shaft of gear motor (it is the power input shaft as to the basket) 1-4 has the worm thread, the lower end of the shaft of the washing-basket is fixed to worm 16, the stated worm screw and the worm gear work together to achieve transmitting power. Shaft 1-4 can also be multi-axial shafts connected together. (for simplicity, the lid of the washing-bucket is not drawn out).

Figure 19:
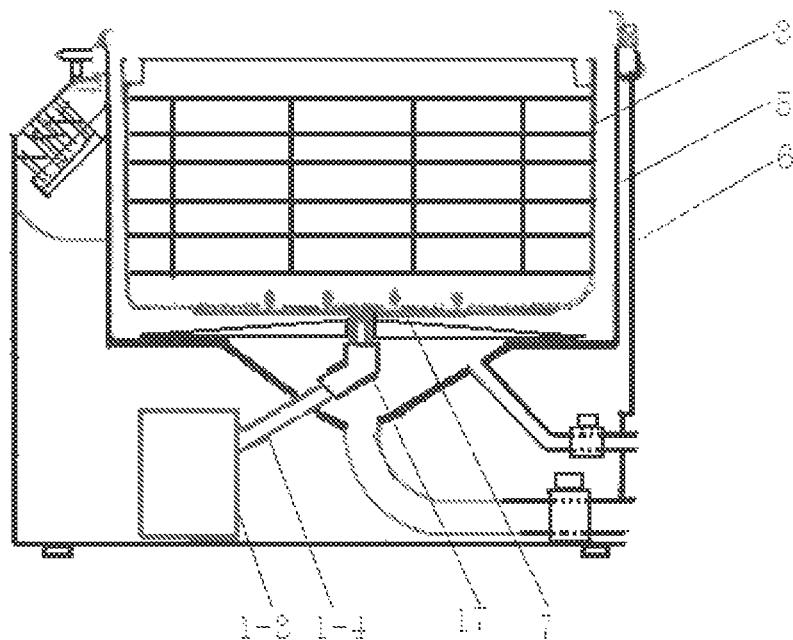
FIG. 19 is the schematic diagram of section view of the eleventh embodiment in this invention.

FIG. 19 is the eleventh embodiment of the present invention. The difference between this embodiment and the embodiment 10 is: transfer power input shaft and shaft of the washing-basket form a pair of crossed shafts, which are connected to the universal coupling 17 to achieve transmitting power. (for simplicity, the lid of the washing-bucket is not drawn out).

FIG. 20 is the schematic diagram of splitting and separating water flow and the Group B impurities in the vegetable washer in this invention.

FIG. 21 is the cycling diagram of the always mixing of water flow and the Group B impurities all along in the vegetable washer in existing technology.

If allowing the instructions attached figures using photographs, I can provide the material photographs of FIG. 22, FIG. 23, FIG. 24 and FIG. 26, since only photographs can prove that there are really shape of products sold on the reality of the market, so as a special case we have to use the photo form. FIG. 27 can be also provided with physical proof photos.

According to the components of the above examples make simple recombination to produce new implementations, all of which belong to the scope of patent protection of the same transformation. And because many common parts and well known transmission mechanism in the field of mechanical can be replaced with each other to achieve the same purpose, any of the embodiment converted out are within the scope of patent protection of the same transformation.

Now demonstrate that the vegetable washer depends mainly on the water flow spraying vegetables is a technology bias. As we all know, all the vegetable washers in the existing technology stress washing vegetables by spraying, called "spray technology", which emphasizes water returns from above and fells off in the washing-basket, and felling off in the washing-basket plays important role in washing vegetables, This can be seen from television advertising of the vegetable washer of the various manufacturers, sales page of selling vegetable washer online. But in fact, this is a technology bias. This technology bias guides people try to open the mouth of the basket, and cannot have the cover so as not to slow down the falling speed of the water flow and affect the placement of water, while the present invention is on the contrary, and filter is located in the basket's inlet, and in the dense filter accumulated a great deal of Group C impurities and some Group B impurities, objectively slowing down the flow rate and affecting the placement of water which is random and irregular. But the washing effect improved significantly. That proves that when water drops the so-called "spray" does not play a key role in washing vegetables, that is, phenomenon of water spraying does exist, but just a kind of water cycling phenomenon of dynamic vegetable washer.

Experiments show that regardless of the placement of the water in the center of the basket or around the basket that is the top of the vegetables (note: vegetables stay surrounding the basket), the washing effect is due to the friction of the gap when water goes through vegetables, rather than the sprinkling of water falling. Because fruits and vegetables are staying within the containment of water from the beginning to the end, and the falling water cannot catch in fruits and vegetables no matter where the whereabouts is. The swimmer can realize this principle most: when a man is swimming in the pool it suddenly rains heavily, his head and shoulders exposed on the surface can feel the rain, but below the surface portions such as loins and legs do not feel the rain, when his body was submerged, then no matter how heavy rain is his body cannot got caught.

Since water's placement has no effect on cleanliness of washing vegetables, the shape of the backwater plate (or called rib flap retaining bar curb retaining piece, etc.) is not important, and can be stand sheet of various shapes. In fact, as to the thin lid of washing-bucket, common practice of the technician in the field of injection is to set ribs to increase its strength, and almost all of the laminated plastic members are provided with such a multichip standing on the back piece, such as the lower surface of everyday plastic stool's surface would have such ribs (see FIG. 27), while after the washing-bucket's lids set up such a strengthened rib in common sense, it objectively plays the role of quickly stopping off the water flowing. In various embodiment of the present invention, the shape of the ribs of the lower surface of the washing-bucket's lid uses well-shaped, spiral-shaped, honeycomb-shaped (means see from bottom graphic), all of which do not affect the washing quality.

The following table shows a comparison of the first embodiment of the vegetable washer of the prior art and that of the present invention:

|  | vegetable washer of Existing Technology | The First Embodiment of this Invention |
|---|---|---|
| Structural difference 1 | The mouth of the basket is opening. | Basket's mouth is coved with impurities prevention. |
| Structural difference 2 | in the center of the bottom of the bucket sets up rotation axis or pedestal penetrated upward. | The bottom of the bucket is opening. |
| Structural difference3 | No filter under the basket. | There is filter preventing large leaves under the basket. |
| Structural difference4 | The method of sewage: sewage in the edge of swirl | The method of sewage: sewage in the center of swirl |
| Structural difference 5 | The bottom of the washing-bucket is plane or quasi-plane. | The bottom of the washing-bucker is funnel-shaped. |
| Effective difference 1 | Impurities participate in circulation, come from around the basket and then spray into the basket. | Impurities are prevented from cycling, and stay in the filter screen of impurities blocker. |
| Effective difference2 | Most of Group B Impurities gather in the center of the bottom of the basket around the rotation shaft. | Most of Group B Impurities are discharged through the opening in the center (small parts stay in the impurities blocker). |
| Effective difference3 | Water in drain-pipe only does forward motion. | Water in drain-pipe does forward motion while rotating, which can prevent the pipe from clogging and leakage. |
| Effective difference 4 | No flipping the vegetables, and the effect of splitting at the dead angle is not very good. | Flipping the vegetables periodically, no flushing the dead angle, the splitting effect is good. |
| Total effective difference | 1. Remove Group A Impurities; 2. Split off Group B Impurities and Group C Impurities. | 1. Remove Group A Impurities; 2. Remove Split off Group B Impurities and Group C Impurities. (can split and divide and remove, is not only split) |

What is claimed is:

1. A washing machine for vegetables to separate visible impurities, which comprises: a chassis, a washing-bucket inside the chassis, a washing-bucket cover, a cover sealing for sealing the washing-bucket cover, a washing-basket inside the washing-bucket, a motor and an electronic control device mounted inside the chassis to drive a rotational movement of the washing-basket, characterized in that:
   said washing-bucket has an outfall opening for draining off water at a center of a bottom of said washing-bucket, said opening is arranged for connecting to outside through a draining pipe,
   said outfall opening of said washing-bucket defines a center opening which has an open position and a closed position, wherein said washing-basket is supported by said washing-bucket without a shaft connection between a center of said bottom of said washing-bucket and said washing-basket, wherein said washing-bucket comprises a special carrying device supporting said washing-basket, a special positioning device limiting a position of said washing-basket, and a special transmission mechanism passing a torque to the washing-basket, wherein the term 'special' refers to a non-shaft or a non-shaft-seat connection with said center of said bottom of said washing-bucket,
   said washing-basket has a port and a filter device is arranged at a position near said port of said washing-basket; and
   said position near said port of said washing-basket is inside the washing-bucket at a height below the washing-bucket cover and above a bottom of said washing-basket.

2. The washing machine for vegetables to separate impurities according to claim 1, said washing machine carries out an automated process of flipping and scrolling for washing fruits or vegetables, comprising the steps of:
   providing said center opening at a closed position and filling said water-bucket with water; driving said washing-basket to rotate so that fruits or vegetables inside said washing-basket are driven to flip and scroll to a peripheral edge of said washing basket; opening said center opening at an open position and draining out the water through said center opening by centripetal motion so that the fruits or vegetables inside said washing-basket are driven to flip and scroll to the center of said washing-basket, thereby an imitating effect of manual flipping of the fruits and vegetables in the water is achieved.

3. The washing machine for vegetables to separate impurities according to claim 2, said position near said port of said washing-basket comprises one or more selected from the group consisting of a position of said port of said washing-basket and an inner wall of said washing-bucket; said filter device is connected to said washing-basket by hinge connection, snap-fixing connection, screw and bolt connection, friction connection or pin plug connection.

4. The washing machine for vegetables to separate impurities according to claim 2, said bottom of said washing-bucket has a funnel-shaped structure with low-center and high-peripheral.

5. The washing machine for vegetables to separate impurities according to claim 4, said bottom of said washing-bucket has an annular step in said bottom of said washing-bucket.

6. The washing machine for vegetables to separate impurities according to claim 4, wherein said special transmission mechanism is connected between said motor and said washing-basket, wherein said special transmission mechanism is a gear-rack coupling mechanism, wherein a rotation axis of said washing-basket or a rotation axis of a tray of said washing-basket is connected to a power input shaft to define a pair of crossed axes, said pair of crossed axes are connected by worm-gear worm-linkage, universal joint, cross coupling or bevel gear.

7. A washing machine for vegetables to separate impurities, which comprises: a chassis, a washing-bucket inside the chassis, a washing-bucket cover, a cover sealing for sealing the washing-bucket cover, a washing-basket inside the washing-bucket, a motor and an electronic control device mounted inside the chassis to drive a rotational movement of the washing-basket, said washing-bucket has an outfall opening for draining off water at a center of a bottom of said washing-bucket, said opening is arranged for connecting to outside through a draining pipe, said outfall opening of said washing-bucket defines a center opening which has an open position and a closed position, said washing-basket is supported by said washing-bucket without a shaft connection between a center of said bottom of said washing-bucket and said washing-basket, said washing-bucket comprises a special carrying device supporting said washing-basket, a special positioning device limiting a position of said washing-basket, and a special transmission mechanism passing a torque to the washing-basket, wherein the term 'special' refers to a non-shaft or a non-shaft-seat connection with said center of said bottom of said washing-bucket, said bottom of said washing-bucket has a funnel-shaped structure with low-center and high-peripheral, said washing-basket comprises a filter apparatus at a position below said washing-basket and above the draining pipe, said filter apparatus has a mesh and a plurality of apertures on said mesh of said filter apparatus, said aperture has a size to allow passage of Group B impurities and to prevent passage of Group C impurities, wherein the Group B impurities are visible impurities attached or included in the vegetables and having a larger density; wherein the Group C impurities are visible impurities attached or included in the vegetables and having a smaller density, and said filter apparatus has a filter frame serving as an additional support member of said washing-basket, wherein said washing machine carries out an automated process of flipping and scrolling for washing fruits or vegetables comprising the steps of: providing said center opening at a closed position and filling said water-bucket with water; driving said washing-basket to rotate so that fruits or vegetables inside said washing-basket are driven to flip and scroll to a peripheral edge of said washing basket opening said center opening at an open position and draining out the water through said center opening by centripetal motion so that the fruits or vegetables inside said washing-basket are driven to flip and scroll to the center of said washing-basket, thereby an imitating effect of manual flipping of the fruits and vegetables in the water is achieved.

8. A washing machine for vegetables to separate visible impurities, which comprises: a chassis, a washing-bucket inside the chassis, a washing-bucket cover, a cover sealing for sealing the washing-bucket cover, a washing-basket inside the washing-bucket, a motor and an electronic control device mounted inside the chassis to drive a rotational movement of the washing-basket, characterized in that:

said washing-bucket has an outfall opening for draining off water at a center of a bottom of said washing-bucket, said opening is arranged for connecting to outside through a draining pipe, wherein said outfall opening of said washing-bucket defines a center opening which has an open position and a closed position, wherein said washing-basket is supported by said washing-bucket without a shaft connection between a center of said bottom of said washing-bucket and said washing-basket, wherein said washing-bucket comprises a special carrying device supporting said washing-basket, a special positioning device limiting a position of said washing-basket, and a special transmission mechanism passing a torque to the washing-basket, wherein the term 'special' refers to a non-shaft or a non-shaft-seat connection with said center of said bottom of said washing-bucket, wherein said washing-basket comprises a filter apparatus at a position below said washing-basket and above the draining pipe, wherein said filter apparatus has a filter frame having a screw-thread on an outer side of said filter frame connecting to said washing bucket, said motor is positioned at a bottom side of the chassis and comprises a gear and an output shaft passing through grooves on a side of said washing-bucket and connecting to said gear.

* * * * *